United States Patent [19]

Emico et al.

[11] Patent Number: 5,802,205

[45] Date of Patent: Sep. 1, 1998

[54] METHOD AND SYSTEM FOR LEXICAL PROCESSING

[75] Inventors: James H. Emico, Palatine; Michael C. Murdock, Lake In The Hills, both of Ill.

[73] Assignee: Motorola, Inc., Schaumburg, Ill.

[21] Appl. No.: 573,711

[22] Filed: Dec. 18, 1995

Related U.S. Application Data

[63] Continuation-in-part of Ser. No. 304,008, Sep. 9, 1994, abandoned.

[51] Int. Cl.$^6$ .............. G06K 9/00; G06K 9/48; G06K 9/03
[52] U.S. Cl. ............ 382/187; 382/198; 382/218; 382/228; 382/310
[58] Field of Search .................. 382/181, 179, 382/182, 185, 186, 187, 188, 190, 310, 176, 159, 198, 218, 219, 228; 395/2.79

[56] References Cited

U.S. PATENT DOCUMENTS

| | | | |
|---|---|---|---|
| 4,773,099 | 9/1988 | Bokser | 382/225 |
| 4,926,491 | 5/1990 | Maeda et al. | 382/155 |
| 5,075,896 | 12/1991 | Wilcox et al. | 382/225 |
| 5,105,468 | 4/1992 | Guyon et al. | 382/158 |
| 5,321,768 | 6/1994 | Fenrich et al. | 382/178 |
| 5,343,537 | 8/1994 | Bellegarda et al. | 382/186 |
| 5,500,920 | 3/1996 | Kupiec | 395/2.79 |
| 5,519,786 | 5/1996 | Courtney et al. | 382/159 |
| 5,559,897 | 9/1996 | Brown et al. | 382/187 |
| 5,588,073 | 12/1996 | Lee et al. | 382/187 |
| 5,594,810 | 1/1997 | Gourdol | 382/187 |

OTHER PUBLICATIONS

Handprinted Numeral Recognition with the Learning Quadratic Discriminant Function by Takahiko Kawatani, 1993 IEEE, pp. 14–22.

Recognition Experiments of Cursive Dynamic Handwriting with Self–Organizing Networks by P. Morasso, L. Barberis, S. Pagliano and D. Vergano, Pattern, Recognition, vol. 26, No. 3, 1993, pp. 451–460.

Wintertree Software Inc. Catalog, 43 Rueter St., Nepean, Onatario, Canada K2J 3Z9, Phone: (613) 825–6271, FAX: (613) 825–5521.

"Polynomial Discriminant Method For Handwritten Digit Recognition" Uma Srinivasan, State University of Buffalo, Dec. 14, 1989.

*Primary Examiner*—Bipin Shalwala
*Attorney, Agent, or Firm*—James E. Gauger

[57] ABSTRACT

A lexical processor and its method of use is provided. The lexical processor includes an input interface (300) and a word generator (302) for producing an output as a function of an input word and a confusion matrix. The confusion matrix is a handwriting error model that is based on the recognition capabilities of classifiers used in preprocessing inputs to the lexical processor. The lexical processor output comprises any of the following: the input word, a rejection indicator, a candidate replacement word, or a suggestion list of related words.

19 Claims, 14 Drawing Sheets

FIG. 6

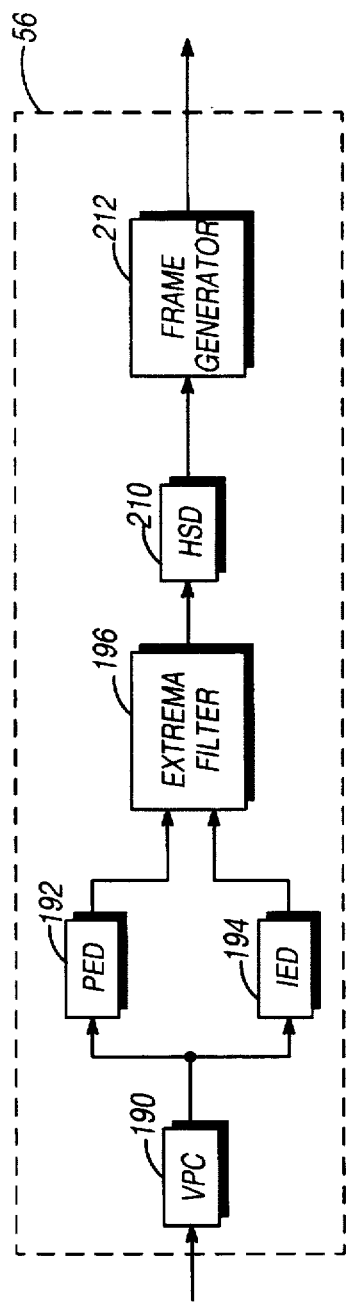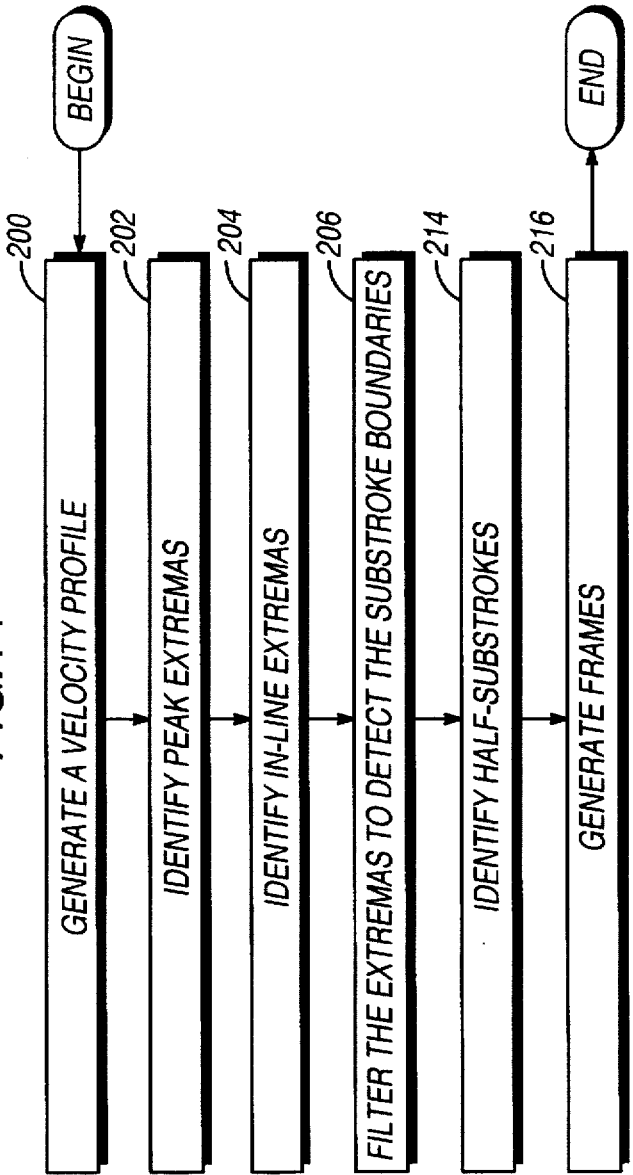

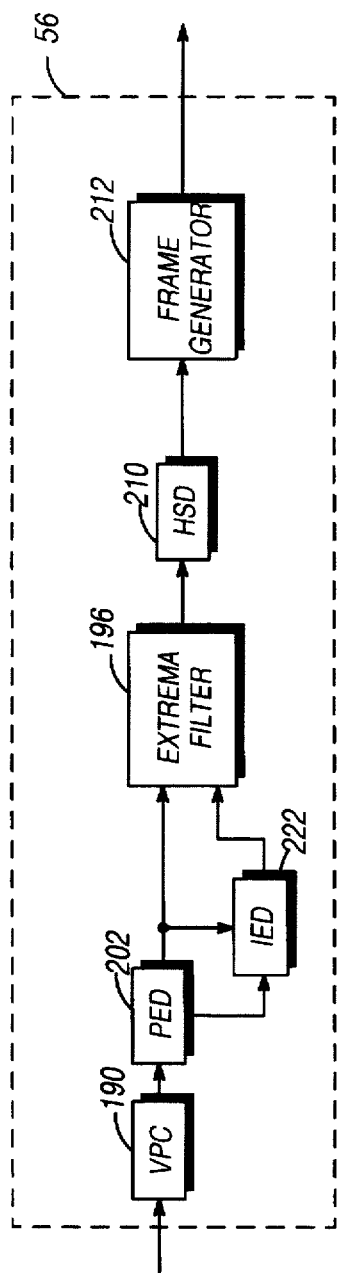
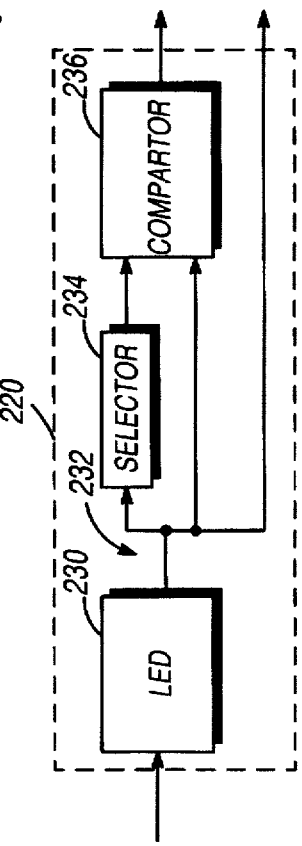
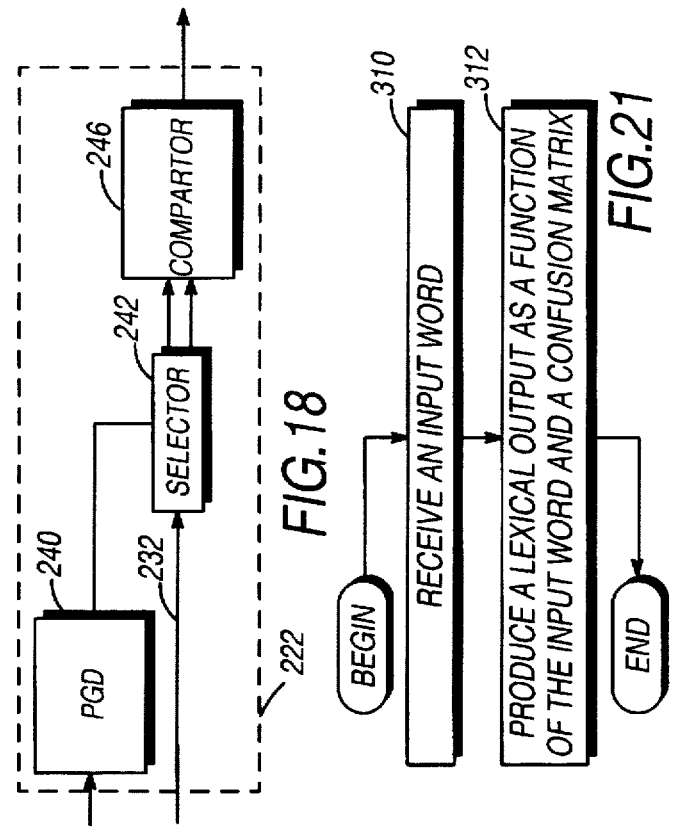
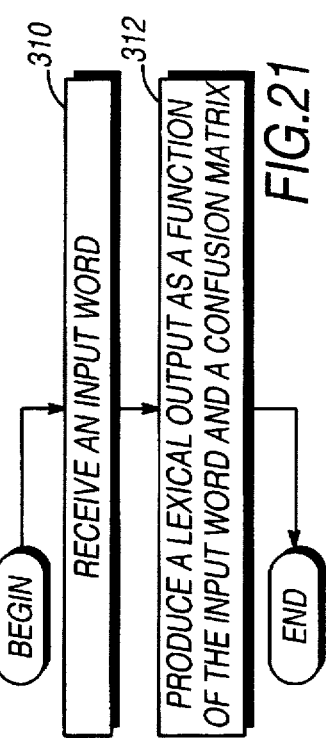
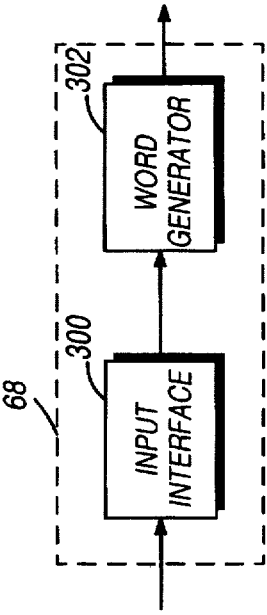

METHOD AND SYSTEM FOR LEXICAL PROCESSING

This is a continuation-in-part of application Ser. No. 08/304,008, filed Sep. 9, 1994, now abandoned in favor of 08/743,332, filed Nov. 4, 1996. The applications listed above are assigned to the same assignee as the present invention and are incorporated herein by this reference.

TECHNICAL FIELD

This invention relates generally to handwriting recognition and, in particular, to a computer implementable lexical processor.

BACKGROUND OF THE INVENTION

For many years, scientists have been trying to find a means to simplify the interface between man and machine. Input devices such as the keyboard, mouse, and touch screen are currently the most commonly used tools for implementing a man/machine interface. However, a simpler and more natural interface between man and machine may be handwriting. A device which automatically recognizes handwriting input would provide such an interface.

Potential applications for a reliable handwriting recognition system include automated data entry and editing for computer systems, such as personal computers and digital assistants.

Unfortunately, automated handwriting recognition is not a trivial task. One reason is that handwriting tends to vary considerably from one person to another. For instance, handwriting can include isolated, connected (cursive), or mixture of characters, that is, a combination of both isolated and connected characters.

Since the late 1960's, various methodologies have been introduced for handwriting recognition. While some methods are based on extended knowledge with corresponding heuristic strategies, others rely on lexical databases and learning methodologies.

The prior art teaches many different pattern recognition techniques that have been applied to the problem of handwriting recognition, four of which are briefly discussed below. These techniques are: tapped delay lines used in conjunction with a conventional pattern recognition, syntactic pattern recognition, time delay neural networks, and hidden Markov modeling. These approaches and their respective shortcomings are described in the following.

Some practitioners of the prior art have attempted to recognize handwriting by using a slightly modified method of conventional, or non-temporal, pattern recognition in which a sequence of input samples is partitioned with a tapped delay line. This means that if n delay elements are used in a tapped delay line, then a sequence of n+1 samples can be presented to non-temporal classifier in parallel and processed as a single pattern. Thus, for a particular application, if a temporal pattern is composed of 100 samples, a 99-tap delay line is used to present the entire pattern, at once, to the classifier. The problem with this approach is that the number of inputs to the classifier can quickly grow too large, and thus become unmanageable, for patterns that are defined over a large number of samples.

Syntactic pattern recognition is a pattern recognition technique based on the assumption that a pattern is a composition of primitive sub-pattern elements. Under this assumption, sub-patterns may be related with a syntax. Using a syntax, it is then possible to define a formal grammar which recognizes the presence or absence of a particular pattern of primitives. The representational capability of this technique generally exceeds that found in other methods of pattern recognition and is thus the primary appeal of syntactic pattern recognition. However, as the complexity of a pattern increases, it becomes increasingly difficult to define a formal grammar. Additionally, once a grammar has been defined it is adversely affected by unexpected variations in the patterns and class definitions.

Time delay neural networks (TDNNS) are a class of neural networks in which the temporal dynamics of patterns are coded in the TDNN architecture with delay-like elements and captured during the training phase of the TDNN. Researchers have used this class of neural network for handwriting and speech recognition. The disadvantage of using a TDNN for handwriting recognition is that pattern warping and compression must be captured during the training phase, resulting in a training phase which is very computational intensive and thus very time consuming.

Hidden Markov modeling (HMM) is a probabilistic technique for the study of patterns. This technique uses stochastic methods to generate a time series which is then analyzed by a parametric model. A HMM has two components: a finite-state Markov chain and a finite set of output probability distributions.

An immediate difficulty with HMM is its complexity, which leads to problems in implementation. In practice there are a large number of inter-related tuning parameters, and some of the tuning parameters require a priori knowledge that often isn't available. In addition, the training samples used for HMM must be selected according to fairly complex criteria. Another drawback of implementing HMM is that the computational costs in the forward-backward computation (which is used for maximum likelihood estimation of the model parameters) can be prohibitively expensive.

Prior art handwriting recognition systems have, at one time or another, incorporated the abovedescribed techniques of performing pattern recognition. However, such handwriting recognition systems suffered from the same disadvantages as given above.

Lexical processing techniques have also been applied to the problem of handwriting recognition. Lexical processing is a dictionary based error correction method in which an input word is compared against a lexicon. Generally, a lexical processor corrects errors by checking either the grammatical or contextual use of a word. However, known lexical processors do not account for variations in handwriting styles or recognition errors cause by pattern classifiers. Hence, they provide only minor improvement in the recognition performance of a handwriting recognition system.

Therefore, there is a significant need for a lexical processor that can be adapted to a specific HRS or handwriting style. In addition, there is a need for a lexical processor which doesn't misidentify proper nouns.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 6 depicts a graphical representation of a confusion matrix.

FIG. 14 illustrates a block diagram representing an alternative embodiment of the frame extractor shown in FIGS. 3 and 5.

FIG. 15 illustrates a flow diagram representing a method of using the frame extractor shown in FIG. 14.

FIG. 16 illustrates a block diagram representing a further embodiment of the frame extractor shown in FIGS. 3 and 5.

FIG. 17 illustrates a block diagram representing the peak extrema detector shown in FIG. 16.

FIG. 18 illustrates a block diagram representing the in-line extrema detector shown in FIG. 16.

FIG. 20 illustrates a block diagram representing a lexical processor in accordance with one embodiment of the present invention.

FIG. 21 illustrates a method of using the lexical processor of FIG. 20 in accordance with an embodiment of the present invention.

DETAILED DESCRIPTION OF A PREFERRED EMBODIMENT

It is an advantage of the present invention to provide a lexical processor that improves the overall recognition accuracy of a HRS. Another advantage of the present invention is that it provides a lexical processor that accepts and correctly processes proper nouns, such as a person's name. A further advantage of the present invention is that it provides a lexical processor that can be tuned to a specific HRS or handwriting style.

Any of the embodiments of the present invention herein disclosed, including those shown in FIGS. 20–21 and 23–25, may be used to process handwriting text of many different languages and alphabets. For example, a set of identifiable characters can include the upper and lower case English alphabet, numerals, punctuation marks, or handwriting gestures, such as those used to edit documents.

Figure 1:
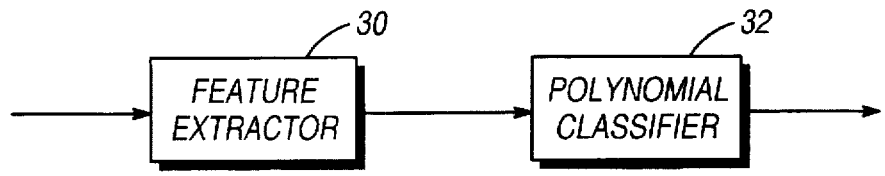
FIG. 1 illustrates a block diagram of a handwriting recognition system that can incorporate an embodiment of the present invention.

FIG. 1 illustrates a block diagram of a HRS that can incorporate an embodiment of the present invention. The HRS comprises a feature extractor 30 and a polynomial classifier 32. The feature extractor 30 receives handwriting input, and in response, extracts a plurality of features from the handwriting input. The features are then provided as input to the polynomial classifier 32. In response to the features, the polynomial classifier 32 generates a discriminant function output signal according to a polynomial expansion. The polynomial expansion can be represented by:

$$y = \sum_{i=0}^{m} w_i \left[ \prod_{j=0}^{n} x_j^{g_{ji}} \right] \quad (1)$$

In Equation 1, $x_j$ represents the features; y represents the discriminant function output signal; $w_i$ represents a coefficient; $g_{ji}$ represents an exponent; and i, j, m and n are integers.

The discriminant function is preferably a second order polynomial expansion of the form:

$$y = a_0 + \sum_{i=0}^{n} b_i x_i + \sum_{i=0}^{n} \sum_{j=0}^{n} c_{ij} x_i x_j \quad (2)$$

In Equation 2, $a_0$ represents a zero-order coefficient, $b_i$ represents a first-order coefficient, and $c_{ij}$ represents a second-order coefficient, $x_i$ and $x_j$ represents the features, y represents the discriminant function output signal, and i, j, m and n are integers.

In various other embodiments, the discriminant function can be based on an orthogonal function, such as a sine, cosine, exponential/logarithmic, Fourier transformation, Legendre polynomial, non-linear basis function such as a Volterra function or a radial basis function, or the like, or a combination of polynomial expansions and orthogonal functions.

The polynomial discriminant function is fitted to a set of samples taken from a p-dimensional feature space representing a plurality of examples. If the number of terms in the polynomial is equal to the number of examples, a matrix-inversion technique may be employed to solve for the value of each coefficient. If the number of terms is not equal to the number of examples, a least-squares estimation technique is employed to solve for the value of each coefficient. Suitable least-squares estimation techniques include, for example, least-squares, extended least-squares, pseudo-inverse algorithm, Kalman filter, maximum-likelihood algorithm, Bayesian estimation, and the like.

Text in the handwriting input is identified based on the discriminant function output signal y. Generally, the discriminant function output signal is compared to other discriminant function outputs. The discriminant function output signal having the greatest magnitude designates the class of the text. A label associated with the class, such as an ASCII symbol representing the text, is output by the HRS.

Figure 2:
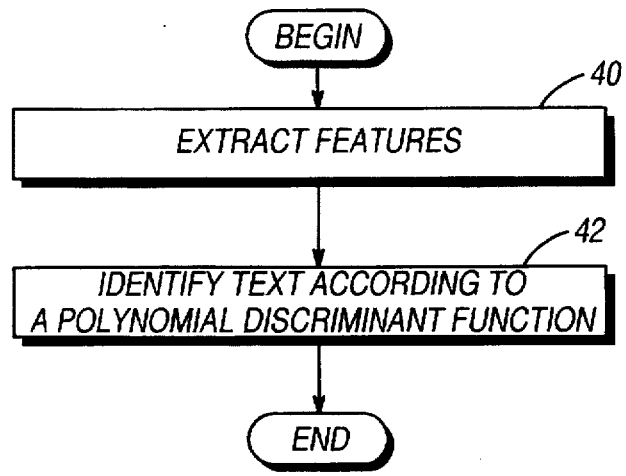
FIG. 2 illustrates a flow diagram of a method of operating the handwriting recognition system shown in FIG. 1.

FIG. 2 illustrates a flow diagram of a method of operating the handwriting recognition system shown in FIG. 1. In box 40, the plurality of features are extracted from the handwriting input. In box 42, text in the handwriting input is identified by applying the features to a polynomial discriminant function. The discriminant function can be represented by either of the polynomial expansions given in Equations 1 and 2.

Figure 3:
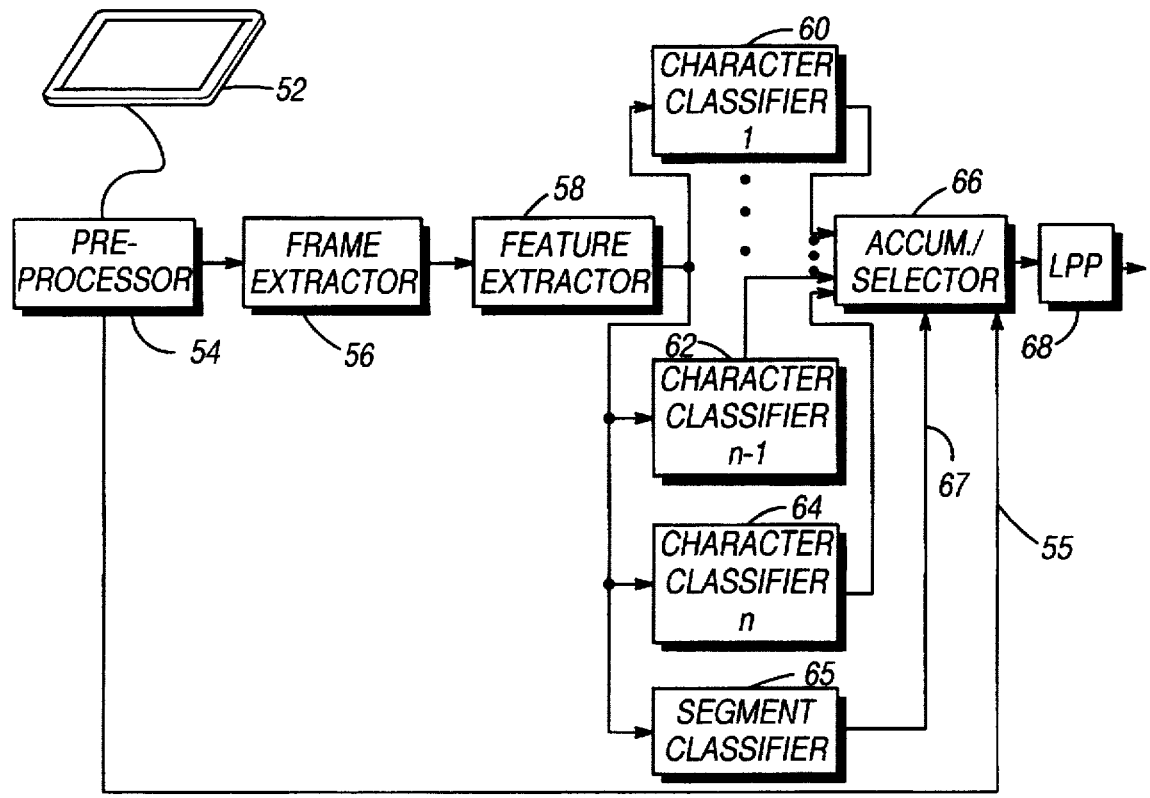
FIG. 3 illustrates a block diagram of a second handwriting recognition system that can incorporate an embodiment of the present invention.

FIG. 3 illustrates a block diagram of a second HRS that can incorporate an embodiment of the present invention. The HRS includes a pen 50, a tablet 52, a pre-processor 54, a frame extractor 56, a feature extractor 58, a plurality of character classifiers 60–64, a segment classifier 65, an accumulator/selector 66, and a lexical post-processor (LPP) 68.

The pen 50 is used to enter handwriting input onto tablet 52. In response to the input, the tablet 52 produces as output a sequence of coordinate-pairs that represent the handwritten text. The pre-processor 54 filters the sequence of coordinate-pairs to remove duplicate coordinate-pairs and unwanted noise. The pre-processor 54 preferably performs low pass filtering on the coordinate-pair sequence to reduce noise.

The frame extractor 56 partitions the filtered sequence from the pre-processor 54 into a sequence of data frames. The data frames are then received by the feature extractor 58, which extracts a plurality of features from the data frames. The features are then distributed to a plurality of classifiers 60–65, four of which are shown in FIG. 3.

Each classifier implements a different discriminant function. The classifiers produce a plurality of discriminant function output signals that are passed to the accumulator/selector 66. The accumulator/selector 66 accumulates the discriminant function output signals, over time, to generate a plurality of confidence values. Based on the confidence values, the accumulator/selector 66 determines "winning" classifiers and outputs the confidence values and class label, associated with the winning classifiers to the LPT1 68. The LPP 68 compares at least one of the confidence values to a lexicon to generate an output signal representing the text contained in the handwriting input.

Turning now to the components of the HRS shown in FIG. 3, the tablet 52 captures handwriting input and converts it into a digital format. Pen-based electronic devices that provide the preferable functionality of the tablet 52 are commercially available from suppliers such as Wacom, Inc.

Essentially, the tablet 52 provides a flat surface upon which a user writes. The surface typically includes charge coupled devices that are sensitive to the position of the tip of the pen 50 and associated with a coordinate plane having x and y axes with resolutions of 0.005". On such a surface, handwriting input can be represented by a plurality of coordinate-pairs (x, y). The position and movement of the pen 50 is captured by sampling the coordinate-pairs as a function of time to generate a sequence of digitized coordinate-pairs, (x, y). Although the sampling can be done at any frequency, it is preferably performed at approximately 100 Hz.

In addition to generating digital signals representing the sequence of coordinate-pairs, the tablet 52 can produce pen activity indicators, such as pen-up and pen-down signals. The pen-up signal indicates that the pen is not touching the writing surface, while the pen-down signal indicates the opposite thereof.

One of ordinary skill in the art will appreciate that other means of obtaining user input can be used instead of the pen 50 and tablet 52. For example, a light pen on a raster monitor can also be used to provide user input to the pre-processor 54.

The pre-processor 54 filters and smoothes the coordinate-pairs to remove noise and optimize the spectral content of the data provided to the feature extractor 58. The pre-processor 54 accomplishes this by passing the sequence of coordinate-pairs through one or more low pass filters (not shown). These filters can adaptively switch on or off depending on the characteristics of the data received from the tablet 52. The low pass filters can be multi-tap finite impulse response (FIR) filters. In addition, the pre-processor 54 can generate more than one filtered sequence from a given sequence of coordinate-pairs.

In one embodiment of the present invention, the pre-processor 54 includes an adaptive filter that performs the low-pass filtering. The adaptive filter facilitates a variable sampling rate.

Duplicate coordinate-pairs, which are generally cause by pen hesitations and noise, can also be filtered by the pre-processor 54. A duplicate coordinate-pair has the same (x, y) value as another coordinate-pair, but is associated with a different sampling time.

The pre-processor 54 generates a filtered sequence representing a sequence of strokes. A stroke is defined as the coordinate-pairs sampled from the handwriting input over a period of time beginning when the pen 50 initially contacts the writing surface of the tablet 52 and ending when the pen subsequently breaks contact with the writing surface. A stroke may include part of a character, a complete character, or an entire word made up of many characters. The pre-processor 54 preferably collects the filtered coordinate-pairs of a stroke into a single data packet which is then passed to the frame extractor 56. A control signal 55 can be transmitted to the accumulator/selector 66 to indicate the beginning or ending of a stroke.

Upon receiving a stroke of filtered coordinate-pairs, the frame extractor 56 partitions the stroke into a plurality of substrokes, also referred to as data frames or frames. A sunstroke includes a subset of stroke coordinate-pairs. Additionally, the substroke represents the preferable data unit size associated with the feature extractor 58, classifiers 60–65, and accumulator/selector 66. The frame extractor 56 delimits substrokes based on the velocity of the pen tip as it is writing. For the purposes of clarity, the term "velocity" as herein used refers to the scalar magnitude of velocity, or more conventionally, speed. The tablet 52 preferably samples the handwriting input at a constant frequency. As a consequence, the velocity of the pen tip is proportional to, the physical distance between coordinate-pairs. For each coordinate-pair, the frame extractor 56 computes an approximate velocity. The frame extractor 56 preferably associates substroke boundaries with selected velocity minimas in the handwriting input.

The feature extractor 58 processes each substroke it receives to extract a corresponding set of features, or measurements. This results in a representation of the substrokes which characterizes the relevant features of the handwriting input. The function of the feature extractor 58 can be regarded as a data reduction procedure that retains vital characteristics of the input and eliminates undesirable interference caused by irrelevant characteristics, thus easing the decision-making process of classifiers 60–65, accumulator/selector 66, and LPP 68.

Examples of features that can be extracted are average rectilinear velocity, curvilinear velocity, angular velocity, stroke angle, data frame index, stroke curvature, Fourier coefficients, or coefficients of a polynomial. Also, multi-frame features can be generated by the feature extractor 58. Examples of multi-frame features include feature continuity and feature persistence. Further details on features that can be utilized by the various HRSs herein disclosed can be found in co-pending U.S. patent application Ser. No. 08/315,784, which is hereby incorporated by reference.

In response to the features extracted from a given substroke, each of the classifiers 60–65 generates a respective discriminant function output signal by computing a polynomial discriminant function. The polynomial discriminant functions generally have the form given by Equation 1 and preferably the form given by Equation 2.

In the example shown in FIG. 3, the character classifiers 60–64 designate different characters, while the segment classifier 65 designates a ligature, i.e., a portion of cursive handwriting that connect characters. The segment classifier produces a segment discriminant signal 67 that is used as a control signal within the accumulator/selector 66. The HRS can incorporate one or more segment classifiers.

When the handwriting input comprises characters which are separated by segments, the segments are identified in order to determine the boundaries of each character. Determining the boundaries of a character increases the probability of correctly identifying the character. Segments are identified in the same manner as characters, that is, they are identified by classifying features.

A sequence of substrokes is classified by the classifiers 60–65. In response to the substroke sequence, each of the classifiers 60–65 generates a respective sequence of discriminant function output signals.

Each sequence of classifier outputs is independently accumulated by the accumulator/selector 66 to generate a character confidence value corresponding to a respective classifier. The character confidence value indicates the relative likelihood that the substroke sequence represent a particular character or segment. The accumulator/selector 66 determines which of the character confidence values has the largest magnitude and then selects a label representing the corresponding character identity.

As output, the accumulator/selector 66 provides a word comprising one or more character labels and character confidence values. The accumulator/selector 66 essentially stores identified characters until a complete stroke is received by the HRS, as indicated by the control signal 55. After processing the entire stroke, the accumulator/selector 66 passes the word to the LPP 68.

The output produced by the accumulator/selector 66 is preferably one or more digital words coded in a computer-readable format. However, one of ordinary skill in the art will appreciate that the output provided may vary in form depending on the application of the system. As with any of the signals herein described, the output could also be an analog or optical signal.

The LPP 68 compares the word information it receives to one or more lexicons. This comparison process increases the overall accuracy of the HRS in recognizing handwritten words. As output, the LPP 68 produces either the original word it received from the accumulator/selector 66, a replacement word selected from the lexicon, or a suggestion list of related words.

Figure 4:
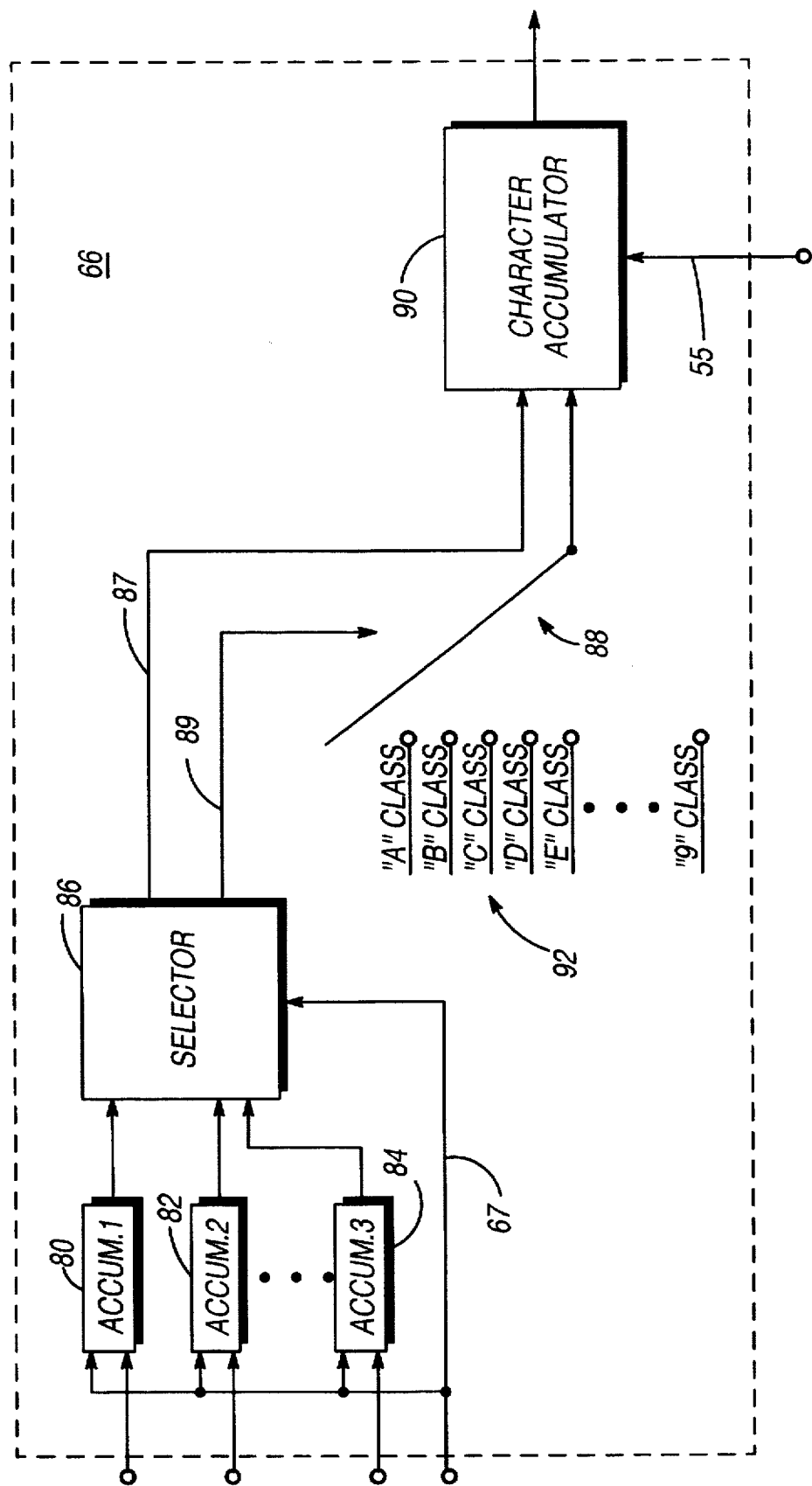
FIG. 4 illustrates a block diagram representing the accumulator/selector shown in FIG. 3.

FIG. 4 illustrates a detailed block diagram of the accumulator/selector 66 shown in FIG. 3. The accumulator/selector 66 includes a plurality of class accumulators 80–84, a selector 86, a plurality of class labels 92, a switch 88, and a character accumulator 90.

The class accumulators 80–84 sum discriminant function outputs from respective ones of the character classifiers 60–64 to generate character confidence values. The selector 86 selects the character confidence value having the greatest magnitude and then passes this selected confidence value to the character accumulator 90. In addition, the selector 86 generates a switch control signal 89 that is used by the switch 88 to select the class label associated with the greatest confidence value.

The class accumulators 80–84 and the selector 86 are reset when a segment confidence value, which is based on the segment discriminant signal 67, exceeds a predetermined segment threshold value.

In an alternative embodiment of the present invention, the segment discriminant signal 67 can be accumulated over a sequence of frames to produce the segment confidence value.

In a further embodiment of the present invention, the segment discriminant signal 67 is compared to a statistical curve template to reset the class accumulators 80–84 and the selector 86.

The class labels 92 identify the characters in the alphabet being used by the HRS. The class labels 92 can be implemented using digital words that are stored in computer memory. In such an implementation, the switch control signal 89 could be a memory address, while the switch 88 could be an address decoder coupled to the computer memory. The digital words preferably represent ASCII symbols.

The character accumulator 90 retains the selected class labels and confidence values until the control signal 55 indicates that an entire word has been processed. The control signal 55 can be time delayed to account for latency in the HRS processes preceding the character accumulator 90. The character accumulator 90 generates the output word for the accumulator/selector 66.

Figure 5:
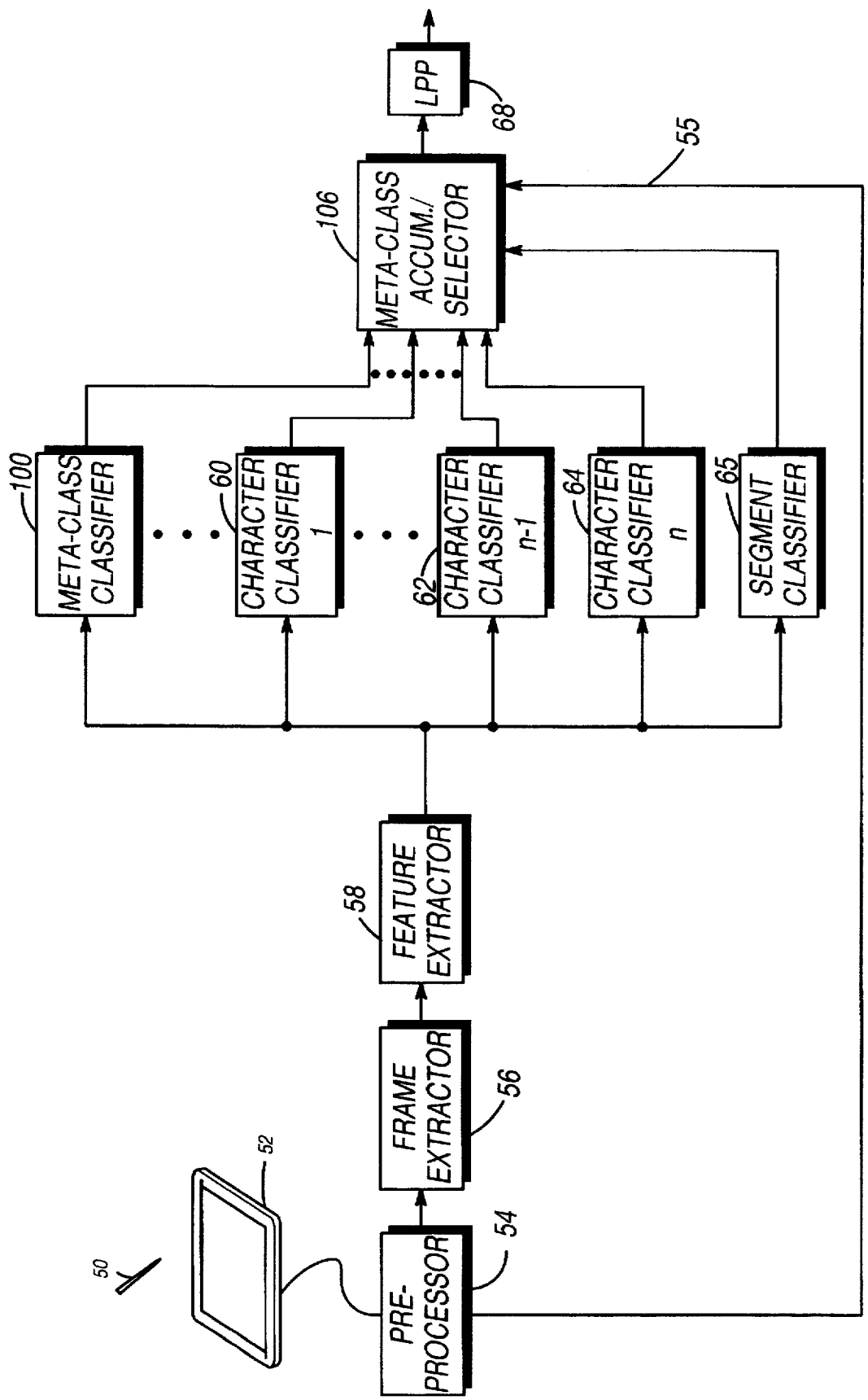
FIG. 5 illustrates a block diagram of a third handwriting recognition system that can incorporate an embodiment of the present invention.

FIG. 5 illustrates a block diagram of a third HRS that can incorporate an embodiment of the present invention. The HRS of FIG. 5 comprises many of the elements described in conjunction with the HRS shown in FIG. 3, that is, the pen 50, the tablet 52, the pre-processor 54, the frame extractor 56, the feature extractor 58, the character and segment classifiers 60–65, and the LPF 6E. In contrast, however, the HRS of FIG. 5 also includes a meta-class classifier 100 and a meta-class accumulator/selector 106. The meta-class classifier 100 and accumulator/selector 106 significantly improve the recognition accuracy of the HRS.

A meta-class is a class that includes two or more characters. Generally, a meta-class includes characters that are not easily discernible from one another. For example, a first meta-class could include the cursive characters i, e, and c, and a second meta-class could include cursive m and n. Meta-classes are defined by using a confusion matrix to determine class membership. Meta-classes and meta-class characters are recognized by the HRS in the same manner as characters, that is, they are identified by classifying features using a polynomial expansion having the form of either Equation 1 or 2 given above.

The use of meta-classes provides superior recognition capability when two or more classes are sufficiently similar that the extracted features do not adequately distinguish between them. One such example is that of lower case cursive 'm' and 'n'. The features typically employed in an HRS would nearly always confuse "m" with "r.". By combining the classes "m" and "n" into a meta-class, the associated meta-class classifier can be trained to recognize either "m" or "n" inputs. This yields a robust, highly accurate "mn" meta-class classifier. Inputs identified as belonging to the meta-class can then be further scrutinized by the locally trained "m" and "n" meta-class character classifiers.

The meta-class character classifiers specifically delineate between the two members of the meta-class, "m" and "n". In addition, localized features, specific to the meta-class members, can be provided to the meta-class character classifiers. To effectively employ the localized features, the "m" and "n" polynomial discriminant functions are separately trained (fitted to examples) so that a training algorithm, such as the singular value decomposition (SVD) algorithm takes advantage of the discriminating information these features provide.

The meta-class classifier 100 generates a discriminant signal that is usable for identifying text in the handwriting input. The meta-class accumulator/selector 106 outputs an identified word based on the character confidence values and discriminant signal.

Figure 6:
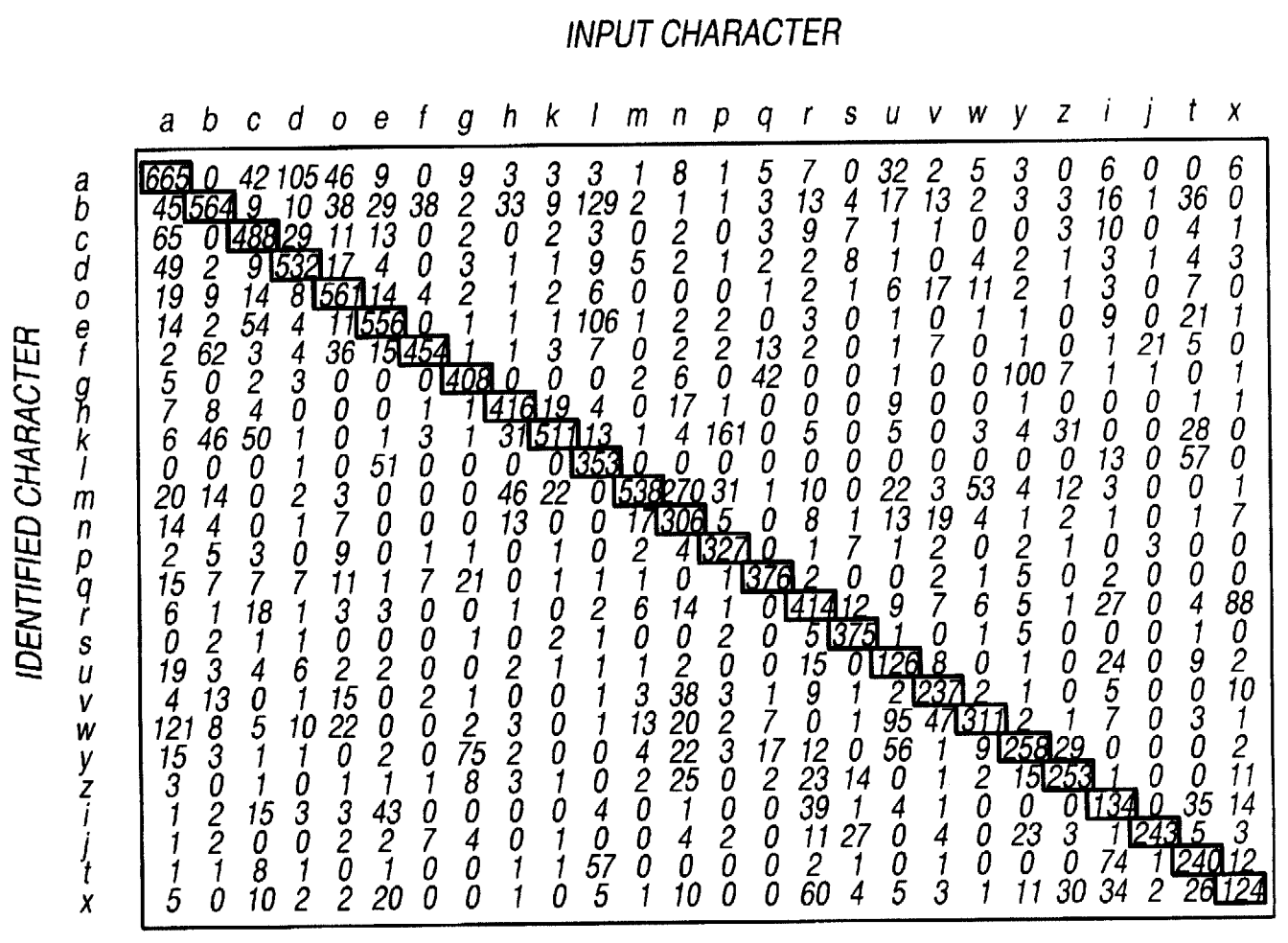

FIG. 6 depicts a graphical representation of a confusion matrix. The confusion matrix consists of empirical results of the HRS's character recognition performance. Typically, these results are obtained without the use of the LPP 68. The confusion matrix provides a basis for a handwriting error model that is useful for improving the recognition performance of the HRS.

The columns in the confusion matrix indicate a known input character and the rows indicate the actual character identified by the HRS during a validation session. Each character in an alphabet has a matrix column associated with it. Each numeric value in the matrix represents the number of times the identified character in the row was generated in response to examples of the known input character indicated by corresponding column. For instance, the total of the values, in the "a" column is 1104. Thus, 1104 examples of the letter "a" were processed by the HRS during the exemplary validation session. The value at location (a,a) is "665". This value means that the HRS correctly identified the letter "a" 665 times out of 1104, or 60.23% of the time. The value at (a, b) is "45". This value indicates that the HRS incorrectly identified the input character "a" as a "b" 45 times.

A meta-class is defined based on the ratios of the various numbers in a given column. Generally, a relatively large number residing off the matrix diagonal indicates that a character classifier is confusing an input character with another, and thus the need for a meta-class classifier. In the example shown, column "n", rows "m" and "n" indicate that a meta-class can be formed that includes the characters m and n. In this HRS, a total of 760 examples of "n" were processed. The HRS correctly identified the input "n" 306 times or 40.3%, while incorrectly identifying it as "m" 270 times.

By defining an "mn" meta-class for this particular HRS, a different polynomial discriminant function can be fitted to the feature space representing the "m" and "n" examples. Separate polynomial discriminant functions for the individual characters "m" and "n" can then be defined using different orders, input features, or numbers of terms. This significantly improves the recognition performance of the HRS.

Figure 7:
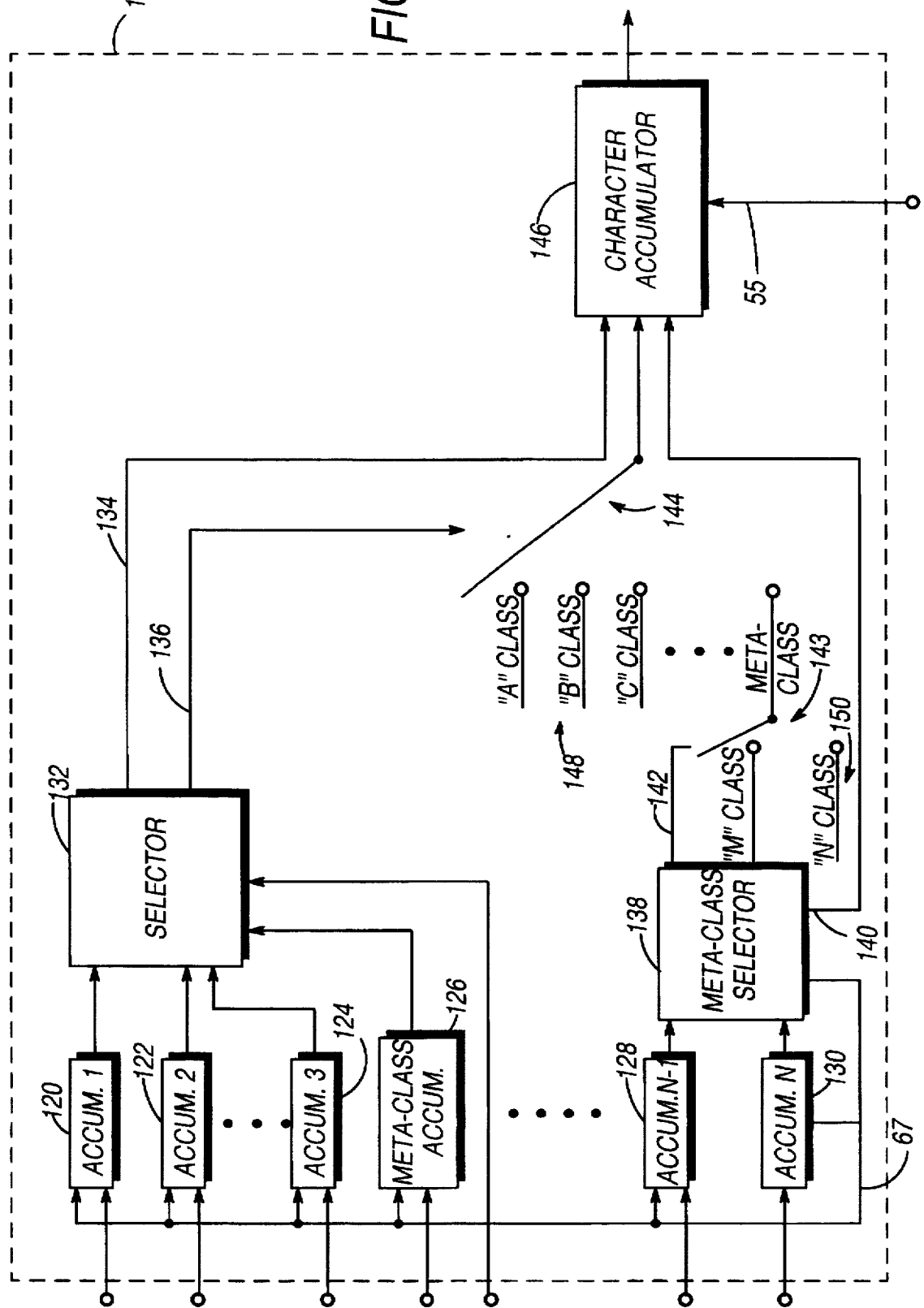
FIG. 7 illustrates a block diagram representing the accumulator/selector shown in FIG. 5.

FIG. 7 illustrates a detailed block diagram representing the accumulator/selector shown in FIG. 5. The accumulator/selector 106 includes a plurality of class accumulators 120–124, a selector 132, a plurality of class labels 148, a switch 144, a meta-class accumulator 126, a plurality of meta-class character accumulators 128–130, a meta-class selector 138, a plurality of meta-class character labels 150, a meta-class switch 143, and a character accumulator 146.

The class accumulators 120–124 sum discriminant function outputs from respective ones of the character classifiers 60–64 to generate character confidence values. The selector 132 selects the character confidence value having the greatest magnitude and then passes this selected confidence value 134 to the character accumulator 146. In addition, the selector 132 generates a switch control signal 136 that is used by the switch 144 to select the class label associated with the greatest confidence value.

The meta-class character accumulators 128–130 likewise sum discriminant function outputs from respective meta-class character classifiers to generate confidence values. The meta-class selector 138 selects the greatest confidence value and generates a meta-class control signal 142 to set the meta-class switch 143.

If the meta-class accumulator 126 produces the largest confidence value, the selector 132 issues the control signal 136 to cause the switch 144 to connect to the meta-class switch 143. In turn, one of the meta-class character labels 150 and its corresponding confidence value 140 is passed to the character accumulator 146.

The class, meta-class, and meta-class character accumulators 120–130, as well as the selector 132 and meta-class selector 138, are reset when a segment confidence value, which is based on the segment discriminant signal 67, exceeds a predetermined segment threshold value. Although not depicted in FIGS. 5 or 7, the segment discriminant signal 67 can be accumulated over a sequence of frames to produce the segment confidence value.

The class and meta-class character labels 148–150 are similar in nature to the class labels 92 described in conjunction with FIG. 4. In addition, the character accumulator 146 functions in a manner similar to that of the character accumulator shown in FIG. 4.

Figure 8:
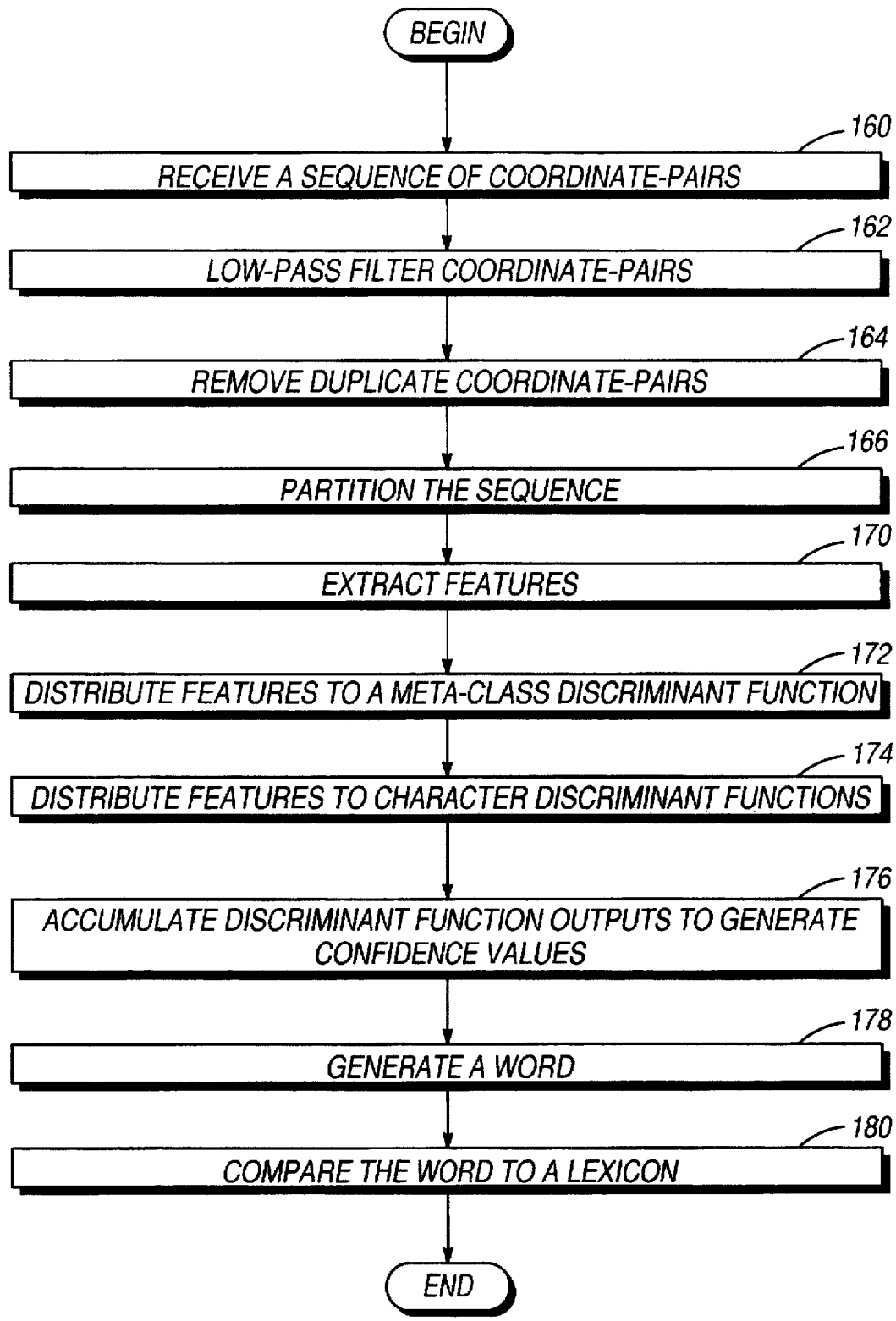
FIG. 8 illustrates a flow diagram of a method of operating the handwriting recognition system shown in FIG. 5.

FIG. 8 illustrates a flow diagram of a method of operating the handwriting recognition system shown in FIG. 5. In box 160, a sequence of coordinate-pairs representing handwriting input is received. The coordinate-pairs are preferably generated by the tablet 52.

In box 162, the coordinate-pairs are transmitted through a low pass filter to remove noise caused by things such as biological tremor, roughness of the writing surface. Next, in box 164, duplicate coordinate-pairs are removed from the sequence to reduce the amount of data processing required by the HRS.

In box 166, the sequence of coordinate-pairs is then partitioned into a sequence of data frames (substrokes). The frame boundaries are preferably based on velocity minimas of the pen tip. In box 168, features are extracted from the data frames.

In box 172, the features are distributed to one or more meta-class discriminant functions. In box 174, the same features are distributed to character discriminant functions. The discriminant functions are preferably second-order polynomial expansions. In box 176, the outputs of the meta-class and character discriminant functions are accumulated to generate a plurality of character confidence values.

In box 178, an identified word is generated based on these confidence values, as previously described in reference to FIGS. 4 and 7. The word can have one or more characters. In box 180, the word is compared to a lexicon. This comparison results in a HRS output that is either the identified word, a candidate replacement word, a suggestion list of related words, or a rejection indicator.

Frame Extraction

Figure 9:
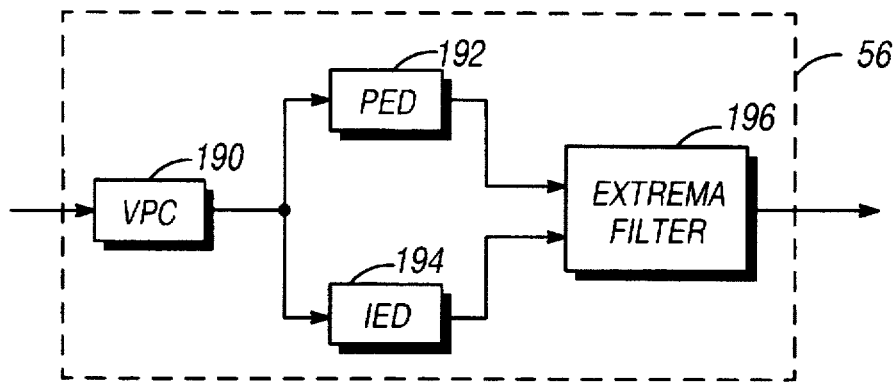
FIG. 9 illustrates a block diagram representing one embodiment of the frame extractor shown in FIGS. 3 and 5.

FIG. 9 illustrates a detailed block diagram representing an embodiment of the frame extractor 56 shown in FIGS. 3 and 5. By partitioning a stroke of handwriting into a plurality of substrokes, the frame extractor 56 improves the overall recognition capability of the HRS. Frame extractor 56 creates a plurality of data frames from a stroke of handwriting. Each data frame comprises a plurality of coordinate-pairs. Essentially, a data frame codes only a fraction of one stroke. A very high level of accuracy and robustness is obtained by incrementally accumulating recognition evidence by classifying features correspondingly extracted from the data frames. In addition, the use of data frames allows greater immunity to hand/pen jitters, character flourishes, and noise from tablet 52.

The frame extractor 56 preferably assigns substroke boundaries at points in the stroke at which the pen tip velocity is an extrema. An extrema is either a maxima or minima of a function. Within a typical handwriting stroke, there are many velocity extremas. It is an advantage of the frame extractor 56 to provide a means for efficiently selecting ones of the velocity extremas to represent the frame boundaries. The frame extractor 56 preferably delimits frames with selected velocity minimas of the pen tip.

The frame extractor 56 comprises a velocity profile calculator (VPC) 190, a peak extrema detector (PED) 192, an in-line extrema detector (IED) 194, and an extrema filter 196.

The VPC 190 generates a velocity profile of a pen trace across the writing surface of the tablet. Although there are different ways of computing pen tip velocities, such as using polynomial approximations, the VPC 190 preferably determines velocities directly from the distances between coordinate-pair samples taken from the handwriting input. As stated earlier, the HRS preferably samples the handwriting input at a fixed frequency, and as a consequence, pen tip velocity is proportional to the physical distance between samples, which can be easily computed from the coordinate-pairs. This technique of calculating velocity provides increased computational efficiency. The profile computed from the handwriting input is provided to both the PED 192 and the IED 194.

The PED 192 identifies a plurality of peak extremas within the velocity profile. An extrema can be either a minima or maxima occurring in the profile. A minima is defined as a velocity point having a lesser magnitude than each point immediately adjacent on either side thereof. Conversely, a maxima is defined as a velocity point having a greater magnitude than each point immediately adjacent on either side thereof. Each extrema has an associated direction—the direction being either maxima or minima.

The PED 192 detects a peak extrema in the profile by comparing a first extrema and a subsequent extrema having an opposite direction, i.e., it compares a minima to a maxima, or vice versa. This can be accomplished by determining the difference between a current smallest minima and a current largest maxima. If the difference is greater than a predetermined peak threshold, the first occurring extrema of this pair is identified as being a peak extrema.

In one embodiment of the present invention, the PED 192 scans forward, with respect to time, through the velocity profile of a stroke. To accomplish this, two software flags are maintained: a peak minima flag to indicate the current smallest minima and the peak maxima flag to indicate the current largest maxima. These flags are respectively initialized to indicate a first minima and a first maxima. If the different between the current largest maxima and the current smallest minima exceeds the peak threshold, the first occurring extrema of the pair is identified as a peak extrema. The respective flag is then updated to indicate the next subsequent extrema in the profile, and the above comparison is repeated.

If the peak threshold is not exceeded, the next extrema in the profile is compared to the current extrema having the same direction. If the next extrema is more extreme than the respective current extrema, the respective flag is updated to indicate the next extrema and the above peak threshold comparison is repeated. Otherwise, another successive extrema is located and the above comparison to the respective current extrema is repeated.

The PED 192 outputs one or more detected peak extremas that alternate in direction to the extrema filter 196.

The IED 194 detects an in-line extrema in the profile by determining the difference between a first extrema and a subsequent extrema having an opposite direction. If the difference is greater than a predetermined in-line threshold, then the first and subsequent extrema are identified as being in-line extremas.

In one embodiment of the present invention, the IED 194 examines a group of extrema between two adjacent peak extremas of the opposite direction. The IED 194 determines the difference between each extrema of the group and the bounding peak extrema of the opposite direction, i.e. a minima extrema within the group is compared to the maxima peak extrema that bounds this group. If the difference is greater than a predetermined peak/in-line threshold, then the extreme group member is considered as a candidate in-line extrema.

Then, in a manner similar to the PED 192, the IED 194 scans forward through the candidate in-line extrema and compares candidate in-lines of the same direction, i.e. it compares a minima to a minima, and selects the smallest minima candidate in-line and the largest maxima candidate in-line. A flag of the current smallest minima candidate in-line extrema and the current largest maxima candidate in-line extrema is maintained. The IED 194 detects an in-line extrema in the profile by determining the difference between the current smallest minima candidate and the current largest maxima candidate. If the difference is greater than a predetermined in-line threshold, then the earlier candidate in-line extrema of this pair is identified as being in-line extrema. After identifying an extrema as an in-line extrema, the IED 194 resets the flag of the current candidate in-line extrema of the same direction, i.e. when a maxima extrema is identified as an in-line extrema the current largest maxima candidate in-line extrema flag is reset. The IED 194 outputs one or more detected peak extremas that alternate in direction to the extrema filter 196.

The extrema filter 196 detects the substroke boundaries by filtering the peak and in-line extremas. The extrema filter ensures that substroke boundaries are at least a predetermined number of samples apart. Thus, some of the in-line and peak extremas are eliminated to produce filtered extremas that are separated one from another by a minimum number of intervening samples. A sample can be a coordinate-pair with its associated velocity. Each of the filtered extrema indicates a substroke boundary. In addition substroke boundaries can be limited to filtered extremas having the same direction.

Figure 10:
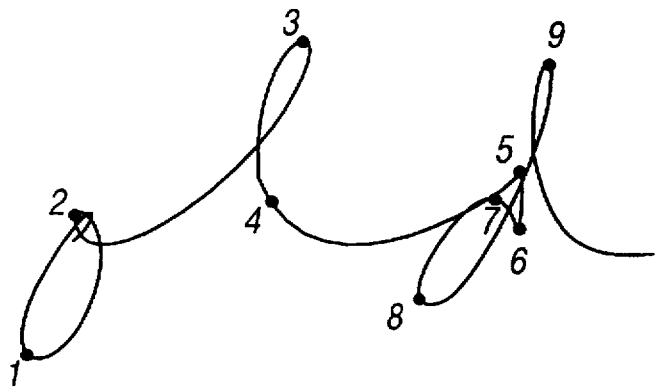
FIG. 10 illustrates a graphical representation of handwriting text.

FIG. 10 illustrates a graphical representation of a stroke of handwriting text. The text in the stroke is the word "old". Sample points 1–9 represent points in the stroke where the velocity is at a minimum.

Figure 11:
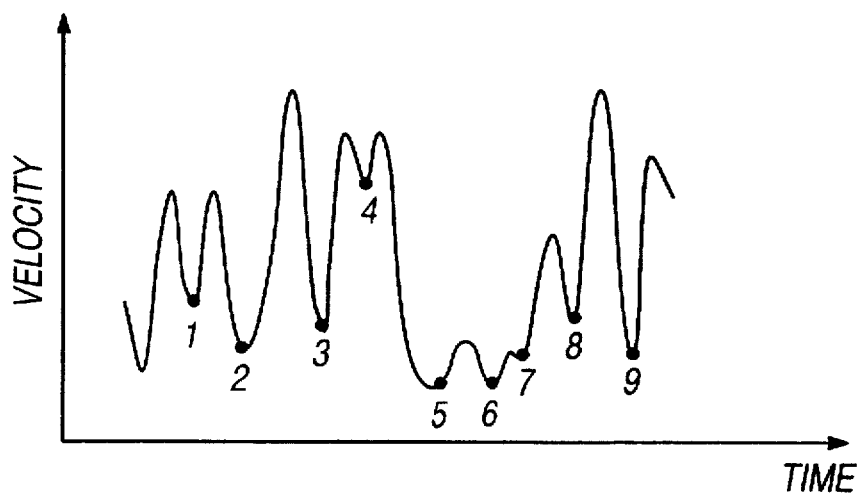
FIG. 11 illustrates a graphical representation of a velocity profile corresponding to the handwriting text of FIG. 10.

FIG. 11 illustrates a graphical representation of the velocity profile corresponding to the stroke of FIG. 10. The y-axis indicates pen tip velocity, and the x-axis represents time. The sample points 1–9 correspond to those shown in FIG. 10.

Figure 12:
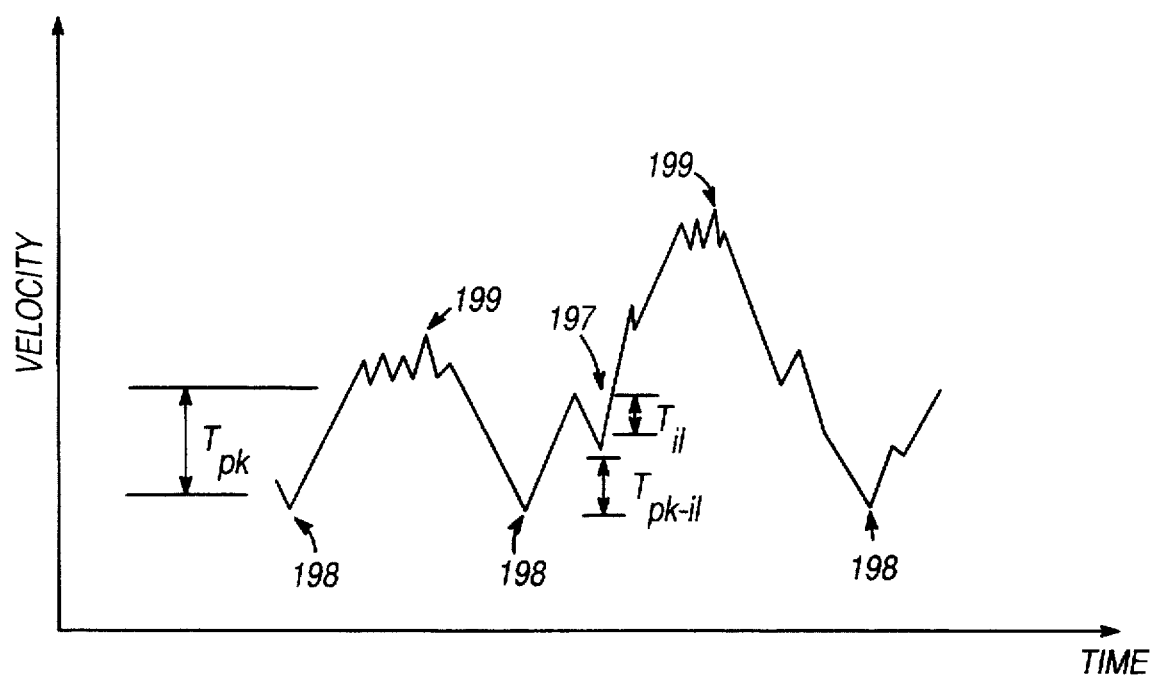
FIG. 12 illustrates a graphical representation of an exemplary velocity profile.

FIG. 12 illustrates a graphical representation of an exemplary velocity profile. Shown in the profile are a plurality of in-line extremas 197 and a plurality of peak extremas 198–199. The peak extremas includes peak minimas 198 and peak maximas 199. As illustrated, the peak extremas are separated by the peak threshold $T_{pk}$. The peak extremas are the most extreme values in their respective peak groups. A peak group includes all velocity points between peak extremas having opposite directions. In addition, within a time-ordered sequence of peak extremes, adjacent peak extremas have opposite directions.

The in-line extremas 197 are separated from each other by the in-line threshold $T_{il}$. Additionally, the in-line extremas 197 are preferably separated, at a minimum, from adjacent peak extremas by a peak/in-line threshold $T_{pk-il}$. This is to prevent extremas near noisy peaks from being incorrectly identified as in-line extremas.

Figure 13:
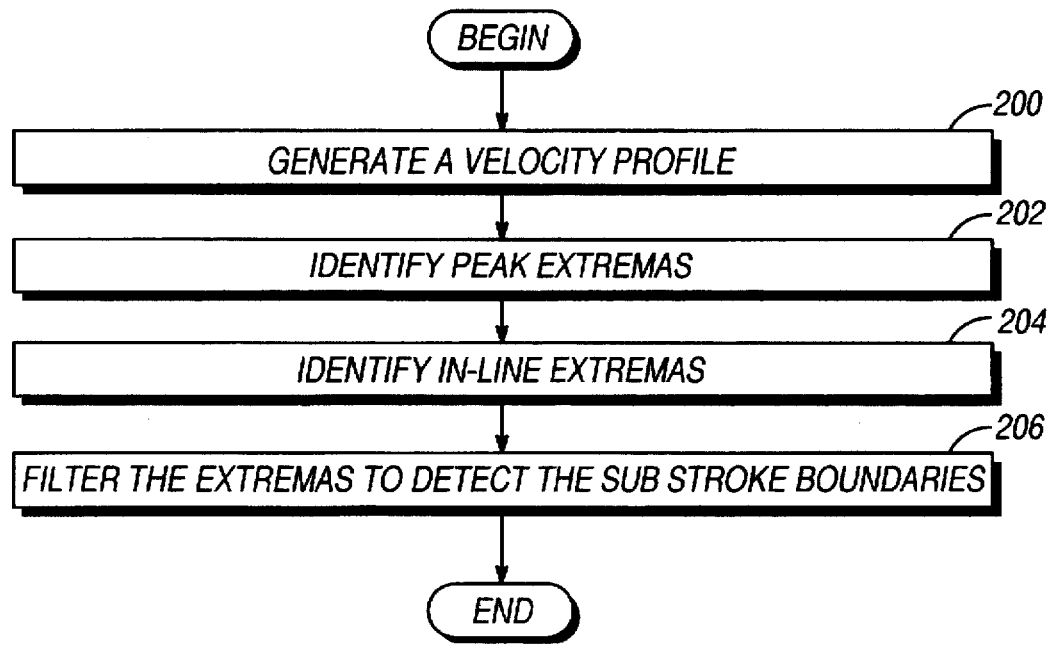
FIG. 13 illustrates a flow diagram representing a method of using the frame extractor shown in FIG. 9.

FIG. 13 illustrates a flow diagram representing a method of using the frame extractor 56 shown in FIG. 9 to generate substroke boundaries. In box 200, a velocity profile is generated from the handwriting input. In a computer, the velocity profile can be represented with an array of velocity data indexed according to time.

In box 202, a plurality of peak extremas within the velocity profile are identified. Next, in box 204, a plurality of in-line extremas within the velocity profile are identified. The in-line and peak extremas are, at this point possible substroke boundaries.

In box 206, the substroke boundaries are detected by filtering the peak and in-line extremas. The extremas are filtered with respect to time in order to ensure that substroke boundaries are separated by a minimum number of intervening sample points.

FIG. 14 illustrates a block diagram representing an alternative embodiment of the frame extractor 56 shown in FIGS. 3 and 5. Elements 190–96 of this embodiment of the frame extractor 56 directly correspond to elements 190–196 described in conjunction with FIG. 9. In addition to the elements 190–196, the frame extractor 56 of FIG. 14 also includes a half-substroke detector (HSD) 210 and a frame generator 212.

The HSD 210 identifies a half-substroke in the handwriting input, based on the filtered extremas it receives from the extrema filter 196. A half-substroke is delimited by a pair of adjacent filtered extremas having opposite directions. This is in contrast to full substroke, which is delimited by filtered extremas having the same direction. Generally, a half-substroke occurs at either the beginning or end of a stroke. Preferably, the HSD 210 concatenates a detected half-substroke to an adjoining full substroke. Alternatively, however, the HSD 210 can explicitly force the half-substroke to be treated as a separate full substroke or filter out the half-substroke. This can prevent a concatenated substroke from becoming unwieldingly large. The output of the HSD 210 is a plurality of substroke boundaries.

The frame generator 212 uses the substroke boundaries to produce a time-ordered sequence of data frames (substrokes). Each data frame includes a plurality of samples, preferably coordinate-pairs, taken from the handwriting input between substroke boundaries. In addition to the samples, a data frame can include information derived from the velocity profile, such as pen tip velocities.

FIG. 15 illustrates a flow Diagram representing a method of using the frame extractor shown in FIG. 14. Steps 200–206 of this method directly correspond to steps 200–206 described in conjunction with FIG. 13.

In box 214, one or more half-substroke are identified using the filtered extremas. The half-substrokes are either concatenated to an adjoining substroke to form a full substroke, or they are indicated as being a regular, full substroke.

In box 216, the data frames are generated based on the substroke boundaries. The data frames are transmitted to the feature extractor 58.

FIG. 16 illustrates a detailed block diagram representing a further embodiment of the frame extractor 56 shown in FIGS. 3 and 5. The VPC 190, extrema filter 196, HSD 210, and frame generator 212 of this embodiment of the frame extractor 56 directly correspond to the same elements described in conjunction with FIGS. 9 and 14. In addition to the above-listed elements, the frame extractor 56 of FIG. 14 also includes an enhanced PED 220 and an enhanced IED 222.

FIG. 17 illustrates a detailed block diagram of the enhanced PED 220 shown in FIG. 16. The PED 220 includes a local extrema detector (LED) 230, a first selector 234, and a first comparator 236.

The LED 230 identifies a plurality of local extremas within the velocity profile. The LED 230 accomplishes this by comparing each velocity point to the velocity points that are immediately adjacent. If the velocity point in question is either the greatest or the least of the three points, then it is identified as a local extrema. The local extremas are distributed on bus 232 to the first selector 234, the first comparator 236, and the IED 222.

The first selector 234 and the first comparator 236 operate in conjunction to identify peak extremas. The first selector 234 selects a first local extrema from the plurality of local extremas. This selection process can be iteratively repeated during the operation of the PED 220. The first extrema is passed to the first comparator 236.

The first comparator 236 compares the first local extrema with a subsequent local extrema having an opposite direction to generate a difference. The subsequent local extrema is selected from the local extremas receive on the bus 232. The first comparator 236 then determines whether the difference is greater than a peak threshold. If so, the first local extrema and the subsequent local extrema are identified as being peak extremas and passed to the IED 222 and the extrema filter 196. If not, another subsequent extrema is chosen and the comparison is repeated. If the difference never exceeds the peak threshold after all comparisons are completed for a given first local extrema, the given first extrema is discarded and another first extrema is sent by the first selector 2,4. The first comparator 236 then repeats the above described processing for the successive first extrema.

FIG. 18 illustrates a detailed block diagram of the enhanced IED 222 shown in FIG. 16. The IED 222 includes a peak group detector (PGD) 240, a second selector 242, and second comparator 246.

In response to the peak extremas from the PED 220, the PGD 240 identifies the boundaries of one or more peak groups within the velocity profile. A peak group includes a set of local extremas being bounded by a pair of peak extremas having opposite directions. Generally, the peak group boundaries are defined with respect to time. The peak group boundaries are transmitted to the second selector 242.

The second selector 242 and the second comparator operate in conjunction to identify in-line extremas. In response to receiving local extremas over the bus 232 and a set of peak group boundaries, the second selector 242 selects a first and a subsequent local extrema from within the peak group. The second local extrema has an opposite direction from the first local extrema.

The second comparator 246 compares the first local extrema with the subsequent local extrema to generate a difference. Then, the second comparator 246 determines whether the difference is greater than an in-line threshold. If so, the second comparator 246 identifies the first and subsequent local extremas as being in-line extremas and outputs them to the extrema filter 196. If not, another subsequent extrema having the opposite direction is chosen and the comparison is repeated. If the difference never exceeds the in-line threshold after all comparisons are completed for a given first local extrema, the given first extrema is discarded and another first extrema is sent by the second selector 242. The second comparator 246 then repeats the above described processing for the successive first extrema.

In an alternative embodiment of the IED 222, the second comparator 246 makes an additional comparison to eliminate any false in-line extremas associated with noisy peaks. This is accomplished by comparing the local extremas against the peak/in-line threshold value. To perform this second test, the second comparator 246 compares the first and subsequent local extremas to the peak extremas bounding their respective peak group. Preferably, each local extrema is compared to the bounding peak extrema with opposite direction thereof. This comparison generates two second differences. The second comparator 246 then determines whether each the second differences are greater than the in-line/peak threshold. If so, the second comparator 246 identifies the first and subsequent local extremas as being in-line extremes. Otherwise, the local extrema pair in question is disregarded as possible substroke boundaries.

Figure 19:
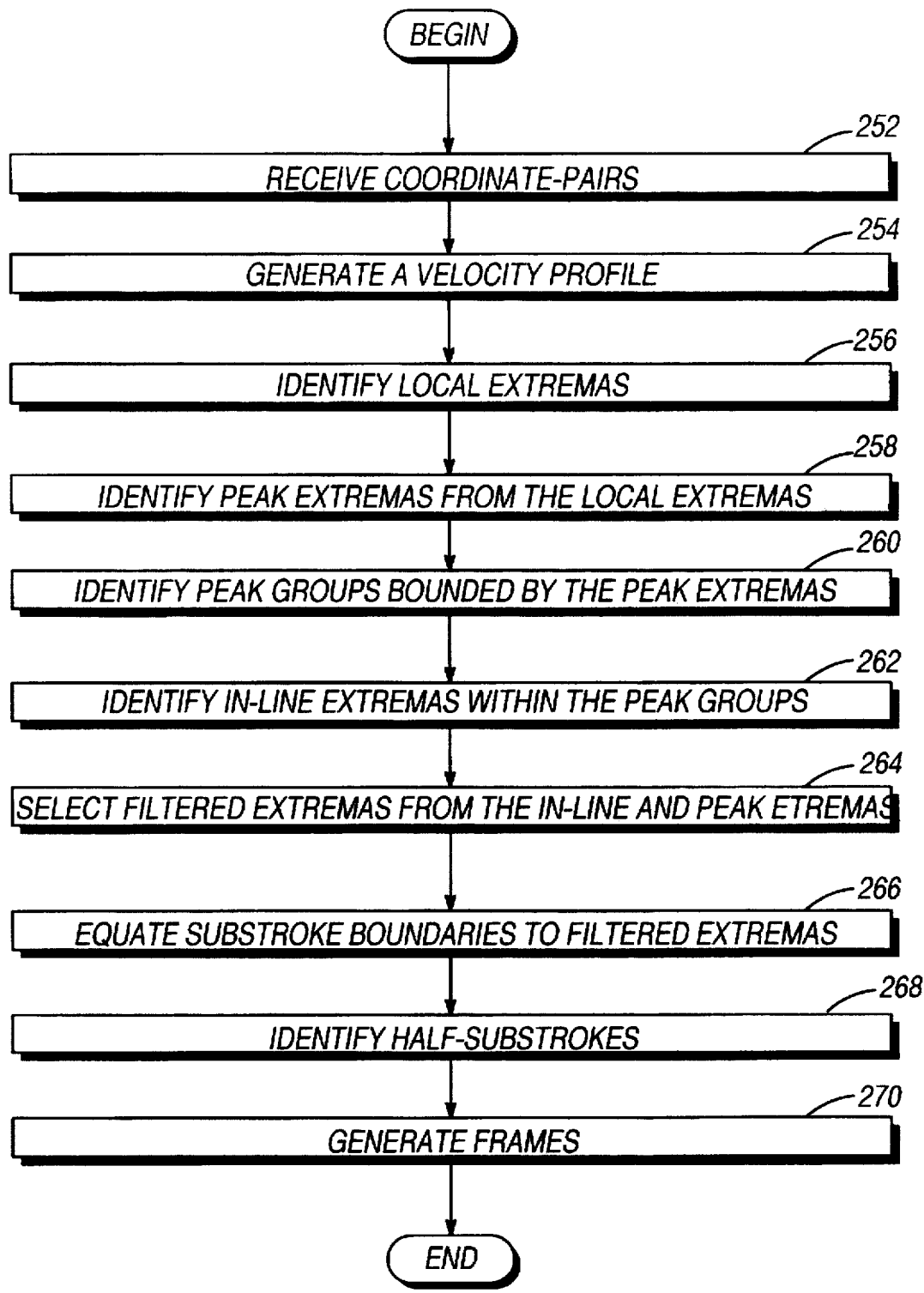
FIG. 19 illustrates a flow diagram representing a method of using the frame extractor shown in FIG. 16.

FIG. 19 illustrates a flow diagram representing a method of using the frame extractor 56 shown in FIG. 16 to generate a substroke frame from handwriting input. In box 252, a sequence of coordinate-pairs that represent the handwriting input is received. In box 254, a velocity profile is generated from the sequence of coordinate-pairs. In box 256, a plurality of local extremas are identified within the velocity profile, where each of the local extremas has an associated direction.

In box 258, peak extremas are identified amongst the local extremas. This is accomplished by comparing the first and subsequent local extrema to generate a first difference. The extremes are selected to have opposite directions. If the first difference is greater than the peak threshold, then the first and subsequent local extremas are identified as peak extremas.

Next, in box 260, peak groups within the velocity profile are identified. Each peak group is bounded by a pair of peak extremes having opposite directions.

In box 262, in-line extremas are identified within each peak group. This is achieved by comparing the local extremas within a peak group. These comparisons are made between local extremas having opposite directions. If the difference between two such local extremas exceeds the in-line threshold, the extremas are identified as being in-line extremas.

In box 264, filtered extremas are selected from the identified peak and in-line extremas. The filtered extremas are chosen so that they are separated one from another by a minimum number of intervening coordinate-pairs. This results in a time-ordered sequence of extremas, minimally separated by a predetermined interval.

In box 266, each of the filter extremas is equated to a substroke boundary, resulting in a sequence of substroke boundaries.

In box 268, one or more half-substroke are identified using the filtered extremas. A half-substroke is bounded by filtered extremas having opposite directions. The half-substrokes are processed by any of the following steps: concatenating them to an adjoining substroke to form a full substroke; idicating them as being a regular, full substroke; or filtering them out.

In box 270, the substroke data frame is generated based on the substroke boundaries. The substroke frame includes those of the coordinate-pairs that occur between a subsequent pair of substroke boundaries. The data frame is transmitted to the feature extractor 58.

Lexical Post-Processing

FIG. 20 illustrates a block diagram representing the lexical post-processor (LPP) 68 in accordance with one embodiment of the present invention. The LPP 68 is a lexical processor that includes an input interface 300 and a word generator 302. The input interface 300 provides a means for receiving an input word. In the HRS, the input word is generated by either the accumulator/selector 66 or the meta-class accumulator/selector 106. The input interface 300 can buffer the input word for future processing by the word generator 302. The word generator 302 produces a lexical output as a function of the input word and a handwriting error model.

In a preferred embodiment of the present invention, the handwriting error model is based on a confusion matrix, such as the one shown in FIG. 6.

An error model is a statistical structure that specifies what kinds of errors the classifiers make. The error model is "statistical" in the sense that it is obtained by observing the behavior of the classifiers and identifying when and how they make mistakes, i.e., insertions, deletions, substitutions, type I errors, type II errors, etc. The error model can be configured to take into account specific writing conditions, such as the type of tablet being used or the gender of the writer.

With the error model we can constrain a lexical search by offering candidate paths through the lexical search space. Since the error model is based on knowledge about classifier errors, it can suggest replacement words from the lexicon. It can make suggestions even on characters with high confidence values because it accounts for the common errors associated with those characters.

FIG. 21 illustrates a method of using the lexical post processor 68 shown in FIG. 20 in accordance with another embodiment of the present invention. In box 310, the input word is received. In box 312, the lexical output is produced as a function of the input word and the handwriting error model.

Figure 22:
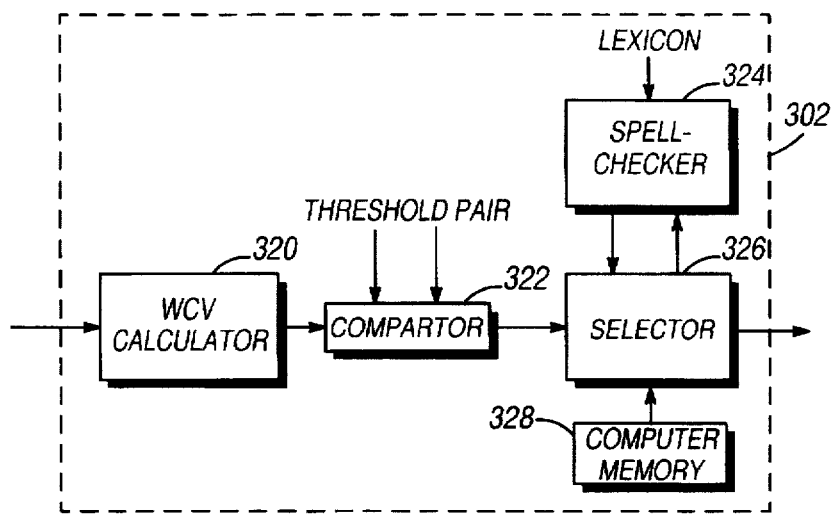
FIG. 22 illustrates a detailed block diagram of the word generator shown in FIG. 20.

FIG. 22 illustrates a detailed block diagram representing the word generator 302 shown in FIG. 20. The word generator 302 comprises a word confidence value (WCV) calculator 320, a comparator 322, a spell-checker 324, a selector 326, and a computer memory 328.

The input word is distributed to the WCV calculator 320 and the selector 326. The WCV calculator provides a means for deriving a word confidence value from the input word. The word confidence value is passed to the comparator 322, which in response, generates a first result by comparing the word confidence value to a first pair of thresholds. The selector 326 produces the lexical output based on the first result. The selector 326 provides the rejection indicator, a candidate word, a suggestion list, or the original input word as the lexical output, depending on the value of the first result.

The candidate word is generated by the selector 326 in the following manner. Using a replacement matrix, which is stored in the computer memory 328, the selector 326 selects a replacement character. The replacement matrix is derived from a confusion matrix, such as the one shown in FIG. 6. The candidate word is then produced by replacing a character in the input word with the replacement character. The spelling of the candidate word is then checked against a lexicon by the spell-checker 324. If the candidate word is not present in the lexicon, the spell-checker 324 produces a suggestion list of related words that is passed back to the selector 326.

In a preferred embodiment of the present invention, the selector 326 selects only those replacement characters having likelihood values that minimize the distance between the candidate word and the input word. The distance is given by:

$$D=\Sigma(C/L) \tag{3}$$

In Equation 3, D represents the distance, C represents the character confidence value associated with the character(s) being replaced in the input word, and L represents the likelihood value associated with the replacement character.

A likelihood value is a relative measurement indicating the probability that a character in the input word has been misclassified as the replacement character associated therewith. Thus, the greater the likelihood value, the greater the chance that the input character was incorrectly identified by the classifiers. For example, the input character "a" could be associated with a replacement character "o" having a correspondingly high likelihood value. This indicates that there is a high chance that an input character classified as "a" is actually be an "o". The likelihood values are contained in the replacement matrix.

The replacement matrix is an array of replacement characters and their corresponding likelihood values. The array is derived from the confusion matrix. Each column in the replacement matrix is associated with a character in the alphabet being used by the HRS. The number of elements in each column can be different. Each element includes a symbol representing a replacement character, such as an ASCII digital word, and the likelihood value associated with the replacement character. Elements in the columns are arranged according to descending likelihood values. In a given row, elements having the same likelihood values are arranged alphabetically.

A replacement character is selected by first matching a character with a column in the replacement matrix and then choosing the element having the largest likelihood value in the column. This selection process can be iteratively repeated, selecting a sequence of replacement characters having decreasing likelihood values.

The replacement matrix is derived from a confusion matrix generally as follows. Using the confusion matrix shown in FIG. 6 as a reference, each element in a given column is normalized with respect to the sum total of all element therein. This column normalization is repeated for every column in the matrix. Next, in each row, the resulting column normalized valves are normalized with respect to the diagonal element of the row. This is accomplished by individually dividing each column normalized value by the diagonal element. The result of these normalizations is a plurality of likelihood values. The replacement matrix is then generated by assigning each row in the normalized confusion matrix to a column in the replacement matrix.

Figure 23:
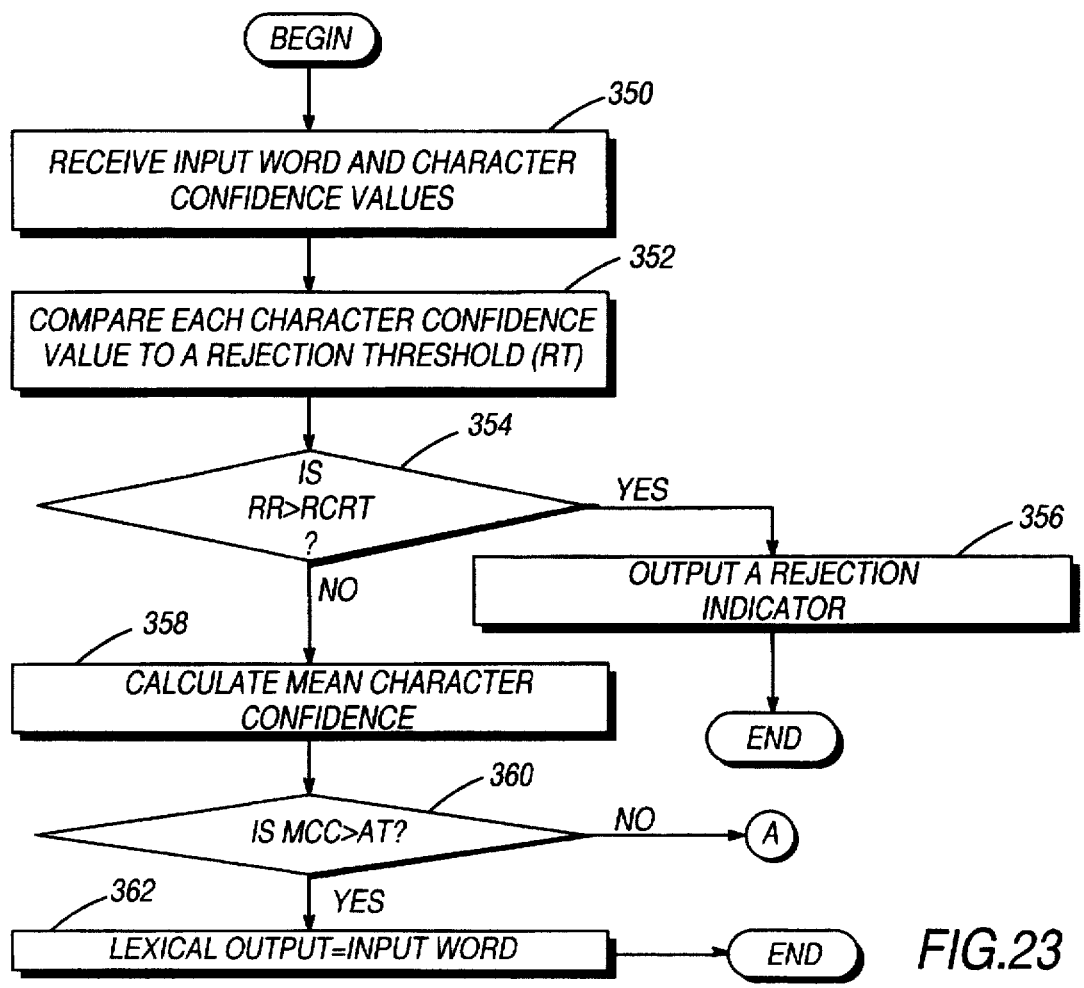
FIGS. 23–25 illustrate a flow diagram representing a method using the lexical processor of FIG. 22 in accordance with a further embodiment of the present invention.
Figure 24:
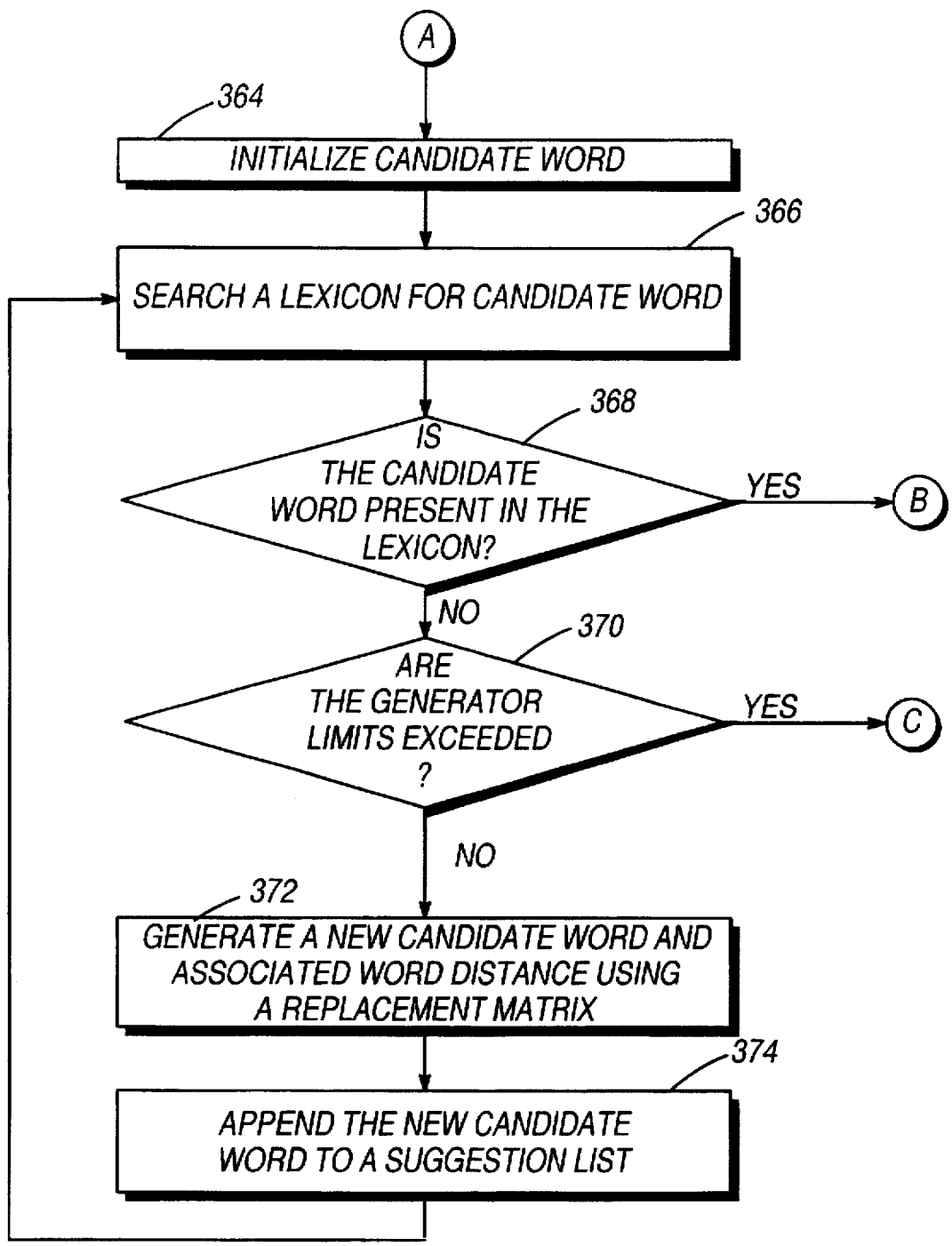
Figure 25:
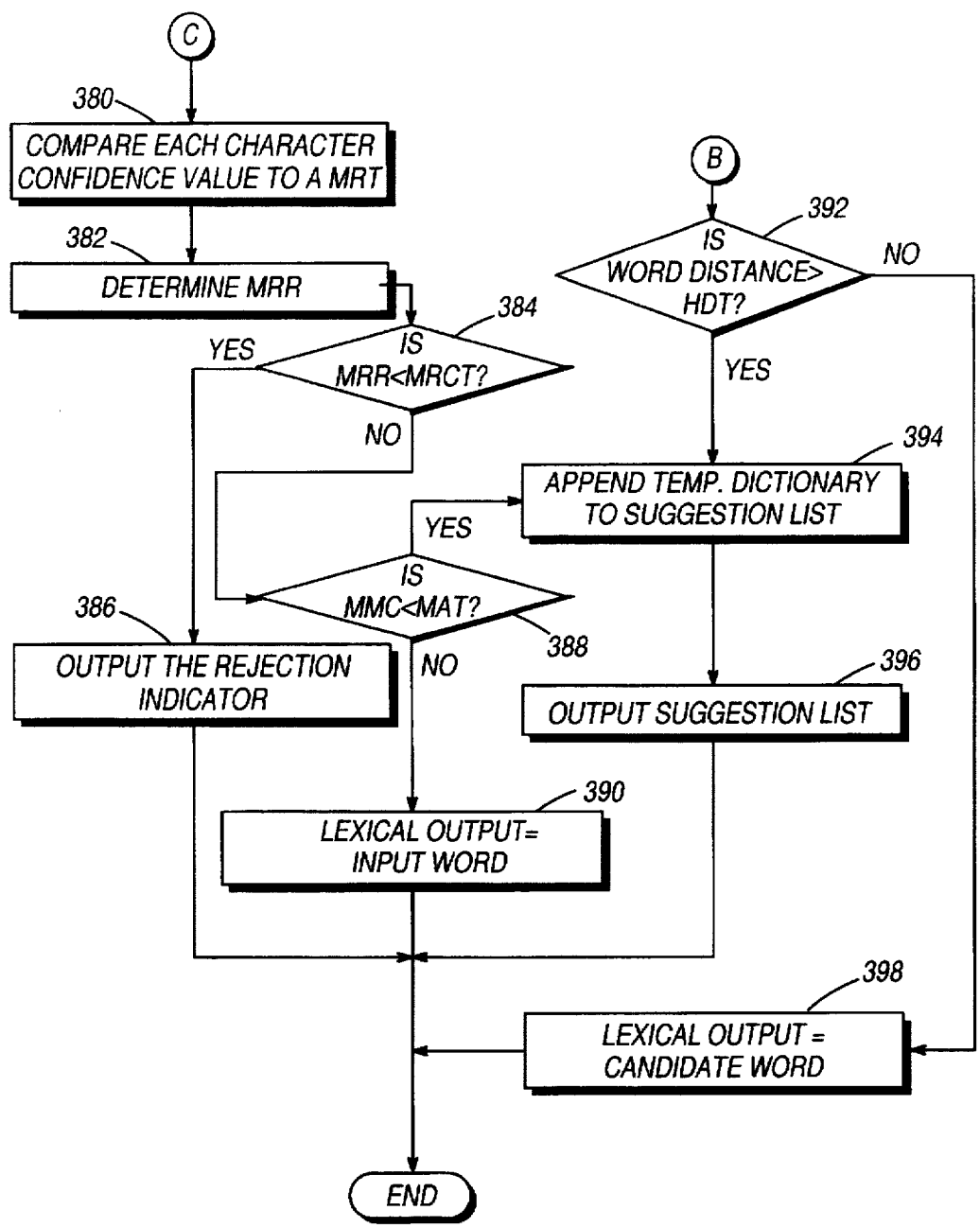

FIGS. 23–25 illustrate a flow diagram representing a method using the lexical post processor 68 of FIG. 22 in accordance with a further embodiment of the present invention.

In FIG. 23, a flow diagram of a process of comparing the input word to a pair of thresholds is shown. In box 350, the input word is received by the lexical processor. The input word includes a plurality of characters and a plurality of character confidence values associated with the characters.

In box 352, each character confidence value is compared to a predetermined rejection threshold (RT). A rejection ratio (RR) is then computed from the results of the comparisons. The rejection ratio is the percentage of characters having confidence values that are less than the rejection threshold.

In decision box 354, a determination is made whether the rejection ratio is greater than a reject character ratio threshold (RCRT). If so, the input word is rejected as unidentifiable and the rejection indicator is output (box 356). If not, the method proceeds to box 358.

In box 358, a mean character confidence (MCC) is calculated. The MCC is the average of the character confidence values of the input word.

In decision box 360, a determination is made whether the MCC is greater than an accept threshold (AT). If so, the lexical output is equated to the original input word. If not, a candidate word is generated according to the process shown in FIG. 24.

In FIG. 24, a flow diagram of the process of generating a candidate word is shown. A candidate word is a variant of the input word. The candidate word is produced by replacing one or more characters in the input word with replacement characters. The replacement characters are selected according to a replacement matrix that is based on the confusion matrix.

In box 364, the candidate word is initialized to be the input word. The initial candidate word has a word distance of zero. The word distance provides a basis for selecting candidate words. It is a numerical value that quantifies the difference between the input word and a possible candidate word. Generally, the greater the word distance between a possible candidate word and the input word, the less likely the possible candidate is going to be selected to replace the input word.

In box 366, one or more lexicons are searched for the candidate word. A lexicon is a dictionary of words. The lexicon can be customized and updated by the HRS user to tailor the HRS to a particular application. In addition, lexicons can be incorporated from third party suppliers of dictionary databases, such as those available from Wintertree Software, Inc.

In box decision 368, a check is made to determine whether the candidate word is present in the lexicon. If so, the lexical output is generated according to the process depicted in FIG. 25. If not, the method proceeds to decision box 370.

In decision box 370, a check is made to determine whether the generator limits are exceeded. If so, the lexical output is generated according to the process depicted in FIG. 25. If not, the method proceeds to box 372. The generator limits are predetermined values that determine the extent of the candidate word generation. The limits include the maximum number of candidate words and the maximum word distance.

In box 372, a new candidate word and its associated word distance is generated. The new candidate word is selected using a replacement matrix that is derived from the confusion matrix.

In box 374, the new candidate word is appended to the suggestion list. The suggestion list comprises all candidate words generated, including the initial candidate word, that is, the input word. Upon exiting box 374, the procedure returns to box 366.

FIG. 25 shows a flow diagram of a procedure generating the lexical output. The procedure is entered from either of boxes 368–370 shown in FIG. 24.

Box 380 is entered if the generator limits have been exceeded. Generally, the sub-process shown in boxes 380–390 is similar to that shown in boxes 352–362;

however, the sub-processes preferably use different threshold values and comparisons.

In box 380, each character confidence value of the original input is compared to a predetermined miss rejection threshold (MRT).

In box 382, a miss rejection ratio (MRR) is then computed from the results of the comparisons. The MRR is the percentage of characters having confidence values that are less than the MRT.

In decision box 384, a determination is made whether the miss rejection ratio is less than a miss reject character ratio threshold (MRCRT). If so, the input word is rejected as unidentifiable and the rejection indicator is output (box 386). If not, the method proceeds to decision box 388.

In decision box 388, a determination is made whether the MCC of the input word is less than a miss accept threshold (MAT). If so, the method proceeds to box 394. If not, the lexical output is equated to the original input word (box 390).

Turning now to box 392, decision box 392 is entered if the candidate word i, located in the lexicon. In box 392, a determination is made whether the word distance of the candidate word is greater than a hit distance threshold (HDT). If so, the method proceeds to box 394. Otherwise, the candidate word is provided as the lexical output (box 398).

In box 394, a temporary dictionary of words is appended to the suggestion list. The temporary dictionary includes words selected from the lexicon that are not already present in the suggestion list. These words are provided to the user as possible replacement words.

Next, in box 396, the suggestion list is provided as the lexical output.

In one embodiment of the present invention, the lexical processor is implemented by software running on a processor such as a microprocessor. However, one of ordinary skill in the art will recognize that a programmable logic array, ASIC or other digital logic device could also be used to implement the functions performed by the HRS.

In another embodiment of the present invention, the lexical processor is implemented as an article of manufacture. The article of manufacture includes a computer-readable memory usable for causing a computer to perform lexical processing. The article of manufacture is produced by the act of storing a computer program in the computer-readable memory, where the computer program includes a method of lexical processing that comprises the steps of receiving an input word and producing a lexical output as a function of the input word and a confusion matrix.

The computer-readable memory could be any means for storing a computer program, including a CD-ROM, hard disk drive, floppy disk, ROM, or RAM.

There has been described herein a concept, as well as several embodiments including a preferred embodiment, of a lexical processor which utilizes a replacement matrix that is based on a handwriting error model. Because the various embodiments of the lexical processor as herein described utilize a replacement matrix, they are significantly more reliable in providing accurate word level error correction. In addition, the use of a replacement matrix allows the embodiments of the lexical processor to be tuned for specific applications and users, thus enhancing the accuracy of the lexical processor. Moreover, the probability of the embodiments of the lexical processor misidentifying proper nouns is greatly reduced because lexical selection criteria is based on the replacement matrix.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a real-time handwriting recognition system, a method of lexical processing that produces a lexical output, the method comprising the following steps:

receiving an input word derived from non-scanned input data, the input word including a plurality of characters and a plurality of character confidence values;

generating a first result by comparing a rejection ratio, based on the plurality of character confidence values, to a reject character ratio threshold;

generating a second result by comparing the average of the plurality of character confidence values to an accept threshold; and producing the lexical output according to the first result and the second result, wherein the lexical output is produced by a process step selected from the group consisting of:
accepting the input word without correction,
rejecting the input word as unidentifiable and including a rejection indicator in the lexical output, and
generating the lexical output as a function of the plurality of character confidence values and a confusion matrix.

2. The method of claim 1, wherein the step of generating the lexical output includes the following steps:

(a) selecting a replacement character by using the confusion matrix;

(b) producing a candidate word by replacing a character in the input word with the replacement character; and (c) equating the lexical output to the candidate word.

3. The method of claim 2, wherein step (b) includes the following sub-step:

selecting the replacement character having a likelihood value that minimizes a distance between the candidate word and the input word, wherein the distance has a form:

$$D = C/L$$

wherein D represents the distance, C represents a character confidence value associated with the character, and L represents the likelihood value.

4. The method of claim 3, further comprising the following step:

deriving the likelihood value from the confusion matrix.

5. The method of claim 2, further including the following steps:

spell-checking the candidate word against a lexicon; and selecting a suggestion list- to be included in the lexical output if the candidate word is not present in the lexicon.

6. In a handwriting recognition system, a method of lexical processing that produces a lexical output, the method comprising the following steps:

receiving an input word having a plurality of characters and a plurality of character confidence values;

generating a rejection ratio as a function of the plurality of character confidence values;

determining whether the rejection ratio is within a reject range;

if so, including a rejection indicator in the lexical output;
if not, generating a mean character confidence as a function of the plurality of character confidence values;
determining whether the mean character confidence value is within an accept range;
if so, equating the lexical output to the input word;
if not, generating a candidate word by;
  using a confusion matrix to select a replacement character having a likelihood value that minimizes a distance between the candidate word and the input word; and replacing at least one of the plurality of characters with the replacement character;
  spell-checking the candidate word against a lexicon to determine whether the candidate word is present in the lexicon;
    if so,
      comparing the distance to a first threshold to produce the lexical output selected from the group consisting of the candidate word and a suggestion list;
    if not,
      generating a miss rejection ratio as a function of the plurality of character confidence values; and selecting the lexical output by comparing the miss rejection ratio and the mean character confidence to a pair of miss thresholds, the lexical output being generated by a process selected from the group consisting of:
        accepting the input word without correction,
        rejecting the input word as unidentifiable and producing the rejection indicator, and generating a suggestion list.

7. The method of claim 6, wherein the distance has a form:

$$D=C/L$$

wherein D represents the distance, C represents a character confidence value associated with one of the plurality of characters, and L represents the likelihood value.

8. The method of claim 7, further comprising the following step:
  deriving the likelihood value from the confusion matrix.

9. The method of claim 1, further comprising the following steps:
  receiving a handwriting input;
  extracting a plurality of features from the handwriting input;
  distributing the plurality of features to a plurality of polynomial discriminant functions that produce the plurality of character confidence values in response to the plurality of features; and
  identifying the input word eased on the plurality of character confidence values.

10. The method of claim 9, wherein the step of identifying includes the following sub-step:
  recognizing the plurality of characters by classifying the plurality of character confidence values.

11. A real-time handwriting recognition system, comprising:
  a lexical processor that includes an input interface receiving an input word derived from non-scanned input data, the input word comprising a plurality of character confidence values and representing a handwritten word having a plurality of characters, a calculator generating a word confidence value based on the character confidence values, a comparator for comparing the word confidence value to a pair of thresholds to produce a comparator output, and a selector producing a processor output in response to the comparator output, a spell-checker, operatively associated with the selector, for spell-checking a candidate word using a dictionary, and a computer memory for storing a confusion matrix;
  wherein the processor output is selected from the input word and candidate word as a function of the comparator output and the confusion matrix.

12. The real-time handwriting recognition system of claim 11, wherein the selector selects a replacement character using the confusion matrix and generates the candidate word by replacing a character in the input word with the replacement character.

13. The real-time handwriting recognition system of claim 12, wherein the selector selects the replacement character based on a likelihood value that minimizes a distance between the candidate word and the input word, wherein the distance has a form:

$$D=C/L$$

wherein D represents the distance, C represents a character confidence value associated with the character, and L represents the likelihood value.

14. The real-time handwriting recognition system of claim 13, wherein the spell-checker selects the suggestion list if the candidate word is not present in the lexicon.

15. An article of manufacture, comprising:
  a computer-readable memory storing a computer program that directs a computer to perform real-time handwriting recognition, wherein the computer program includes steps for receiving an input word derived from non-scanned input data, the input word including a plurality of character confidence values and a plurality of characters representing a word included in the handwriting text,
  generating a first result by comparing a rejection ratio, based on the plurality of character confidence values, to a reject character ratio threshold,
  generating a word confidence value based on the average of the character confidence values;
  comparing the word confidence value to an accept threshold to generate a second result, and
  producing the lexical output according to the first result and the second result, wherein the lexical output is produced by a computer program step selected from the group consisting of accepting the input word without correction, rejecting the input word as unidentifiable and including a rejection indicator in the lexical output, and generating the lexical output as a function of the plurality of character confidence values and a confusion matrix.

16. The article of manufacture of claim 15, wherein the computer program further includes the following steps:
  (a) selecting a replacement character as a function of the confusion matrix;
  (b) producing a candidate word by replacing a character in the input word with the replacement character; and
  (c) including the candidate word in the lexical output.

17. The article of manufacture of claim 15, wherein step (b) includes the following sub-step:
  selecting the replacement character based on a likelihood value that minimizes a distance between the candidate word and the input word, wherein the distance has a form:

$$D=C/L$$

wherein D represents the distance, C represents a character confidence value associated with the character, and L represents the likelihood value.

18. The article of manufacture of claim 17, wherein the computer program further includes the following step:

deriving the likelihood value from the confusion matrix.

19. The article of manufacture of claim 15, wherein the computer program further includes the following steps:

spell-checking the candidate word against a lexicon; and selecting a suggestion list to be included in the lexical output if the candidate word is not present in the lexicon.

* * * * *

UNITED STATES PATENT AND TRADEMARK OFFICE
CERTIFICATE OF CORRECTION

PATENT NO.  : 5,802,205
DATED       : September 1, 1998
INVENTOR(S) : Errico, et al It is certified that error appears in the above-indentified patent and that said Letters Patent is hereby corrected as shown below:

On title page, items [19] and [75], "Emico" should read "Errico".

In claim 9, column 21, line 53, "eased" should be "based".

Signed and Sealed this

Tenth Day of August, 1999

Attest:

Q. TODD DICKINSON

*Attesting Officer*  *Acting Commissioner of Patents and Trademarks*